United States Patent [19]
Demiray et al.

[11] Patent Number: 5,872,780
[45] Date of Patent: Feb. 16, 1999

[54] SONET DATA TRANSFER PROTOCOL BETWEEN FACILITY INTERFACES AND CROSS-CONNECT

[75] Inventors: Sahabettin C. Demiray; Dale L. Krisher, both of Raleigh; William B. Weeber, Apex, all of N.C.

[73] Assignee: Alcatel Network Systems, Inc., Richardson, Tex.

[21] Appl. No.: 886,724

[22] Filed: May 21, 1992

[51] Int. Cl.⁶ .................................................. H04L 12/52
[52] U.S. Cl. .................. 370/359; 370/514; 370/907; 371/49.1
[58] Field of Search .............................. 370/14, 53, 58.1, 370/58.2, 60, 68.1, 94.2, 100.1, 105.1, 110.1, 216, 357, 359, 360, 503, 514, 516, 907; 371/5.1, 5.5, 49.1, 49.2

[56] References Cited

U.S. PATENT DOCUMENTS

| | | | |
|---|---|---|---|
| 4,797,654 | 1/1989 | Young et al. | 370/467 |
| 4,827,477 | 5/1989 | Avaneas | 371/49.1 |
| 4,998,242 | 3/1991 | Upp | 370/392 |
| 5,001,708 | 3/1991 | Williams et al. | 370/509 |
| 5,023,872 | 6/1991 | Annamalai | 371/5.1 |
| 5,134,614 | 7/1992 | Baydar et al. | 370/522 |
| 5,155,728 | 10/1992 | Takeuchi et al. | 370/509 |

FOREIGN PATENT DOCUMENTS 9000991  1/1990  France.

*Primary Examiner*—Benedict V. Safourek
*Attorney, Agent, or Firm*—Ware, Fressola, Van Der Sluys & Adolphson LLP

[57] ABSTRACT

An internal signal within a SONET element has a transport format having overhead and payload mapped in a manner similar to the Synchronous Optical Network standard mapping, except having selected overhead bytes defined differently, including a byte used for communicating odd parity calculated over an odd number of bytes of a frame of the transport format to determine correct or incorrect parity, selected bytes used for inter-module automatic protection switching, and a pointer having a selected fixed value, along with an adjusted virtual tributary pointer in a virtual tributary mode.

3 Claims, 17 Drawing Sheets

```
column numbers for:
STS-1** 2  3  4  5  6      31 32 33 34 35    60 61 62 63 64    89 90
STS SPE        1  2  3     28 29 30 31 32    57 58 59 60 61       86 87
```

| | 1 | 2 | 3 | 4 | 5 | 6 | ... | 31 | 32 | 33 | 34 | 35 | ... | 60 | 61 | 62 | 63 | 64 | ... | 89 | 90 |
|---|---|---|---|---|---|---|---|---|---|---|---|---|---|---|---|---|---|---|---|---|---|
| 1 | A1* | A2* | C1* | | | | | | | | | | | | | | | | | | |
| 2 | B1* | | | | | | | | | | | | | | | | | | | | |
| 3 | | | | | | | | | | | | | | | | | | | | | |
| 4 | H1* | H2* | H3* | | | | | | | | | | | | | | | | | | |
| 5 | B2* | K1* | K2* | | | | | | | | | | | | | | | | | | |
| 6 | | | | | | | | | | | | | | | | | | | | | |
| 7 | | | | | | | | | | | | | | | | | | | | | |
| 8 | | | | | | | | | | | | | | | | | | | | | |
| 9 | | | | | | | | | | | | | | | | | | | | | |

FIG. 1

```
column numbers for:
STS-1** 2  3  4    5     6       31 32 33  34 35      60 61 62  63 64     89 90
STS SPE        1    2     3      28 29 30  31 32      57 58 59  60 61       86 87
VT2            1   2...21 1..6 7  8 9..21 1..13 14   15 16..21 1..20 21
VT1.5          1    2     27 28   1  2    27  28      1  2     27  28
```

| | 1 | 2 | 3 | 4 | 5 | 6 | ... | 31 | 32 | 33 | 34 | 35 | ... | 60 | 61 | 62 | 63 | 64 | ... | 89 | 90 |
|---|---|---|---|---|---|---|---|---|---|---|---|---|---|---|---|---|---|---|---|---|---|
| 1 | A1* | A2* | C1* | J1 | | | | | | R | | | | | | R | | | | | |
| 2 | B1* | | | B3 | | | | | | R | | | | | | R | | | | | |
| 3 | | | | C2 | | | | | | R | | | | | | R | | | | | |
| 4 | H1* | H2* | H3* | G1 | | | | | | R | | | | | | R | | | | | |
| 5 | B2* | K1* | K2* | F2 | | | | | | R | | | | | | R | | | | | |
| 6 | | | | H4* | | | | | | R | | | | | | R | | | | | |
| 7 | | | | Z3 | | | | | | R | | | | | | R | | | | | |
| 8 | | | | Z4 | | | | | | R | | | | | | R | | | | | |
| 9 | | | | Z5 | | | | | | R | | | | | | R | | | | | |

FIG. 2

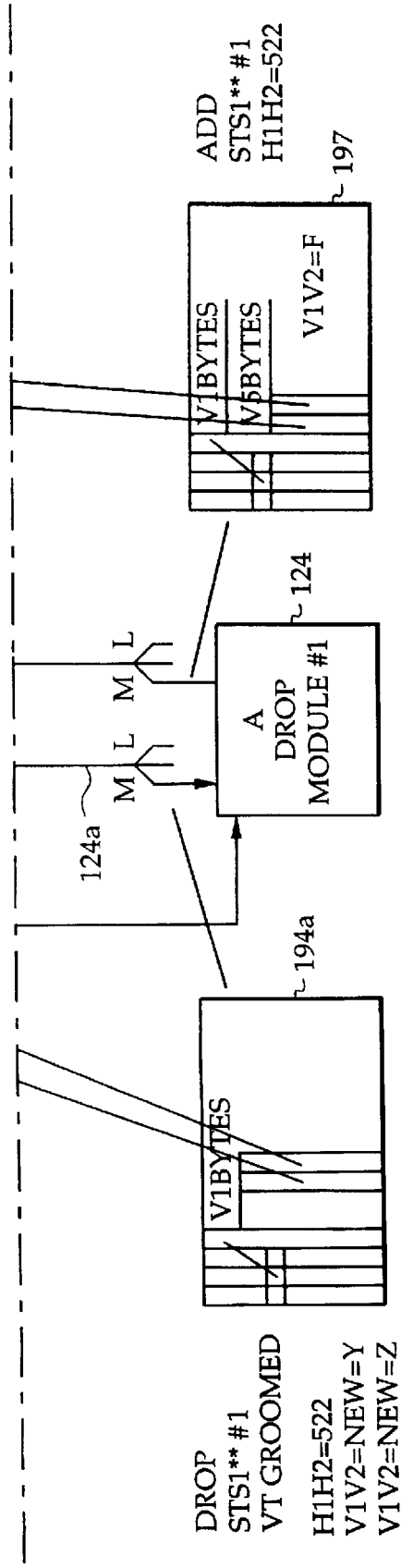

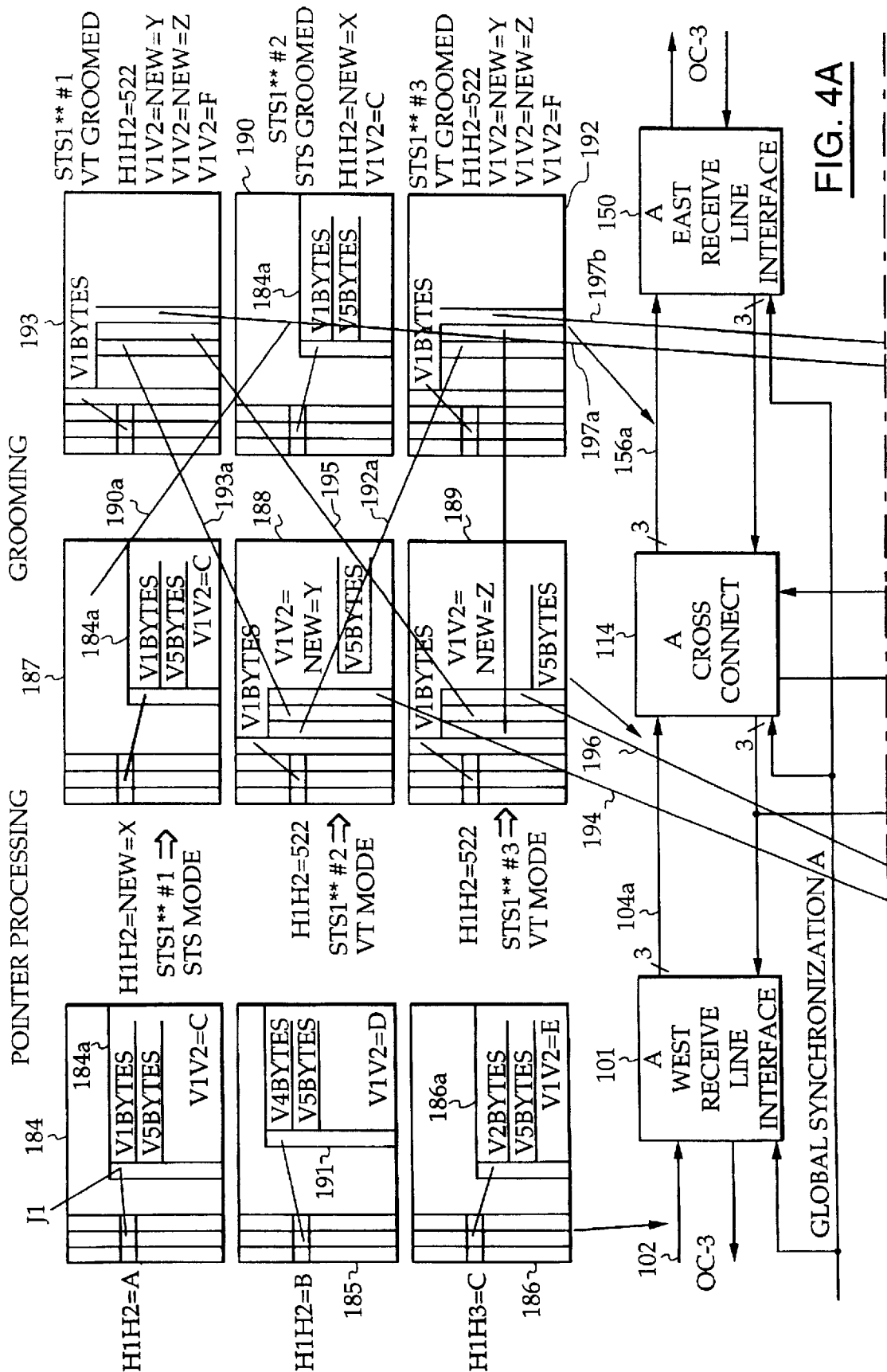

B1 CALCULATED OVER EVEN NUMBER OF BYTES IN THE FRAME

B2 CALCULATED OVER ODD NUMBER OF BYTES IN THE FRAME

SONET DATA TRANSFER PROTOCOL BETWEEN FACILITY INTERFACES AND CROSS-CONNECT

CROSS-REFERENCE TO RELATED APPLICATIONS

This disclosure discloses subject matter which is related and disclosed and claimed in co-owned, copending applications U.S. Ser. No. 07/887,348, now U.S. Pat. No. 5,706,299; 07/887,156, now U.S. Pat. No. 5,740,157; 07/886,723, now U.S. Pat. No. 5,715,248; 07/886,755 abandoned in favor of U.S. Pat. No. 08/176,309, now U.S. Pat. No. 5,717,693; 07/886,789 abandoned in favor of U.S. Pat. No. 08/783,197, all filed on even date herewith and which is related to subject matter disclosed in U.S. Ser. Nos. 07/884,238, now U.S. Pat. Nos. 5,365,518 and 07/844,245, now U.S. Pat. No. 5,315,594, both filed on Mar. 2, 1992, all of which are hereby incorporated by reference.

TECHNICAL FIELD

This invention relates to communications and, more particularly, to a transport format in a synchronous optical network (SONET) element.

BACKGROUND OF THE INVENTION

A data transfer protocol may be desired to provide an internal data interface between modules within a SONET element. Further, for a network element having east and west high-speed interfaces, a cross-connect and drop modules, it may be desired that the data entering the cross-connect from the high-speed interfaces and the drop modules be frame aligned to simplify the cross-connect implementation. It may also be desirable that an error checking mechanism exist in the frame structure.

For SONET signals incoming to and outgoing from the network element, the American National Standard T1.105-Draft-September 1990, incorporated herein by reference, defines a standard format including section, line and path overhead bytes B1, B2, B3, respectively, in Secs. 9.2.1, 9.2.2 and 9.2.3 thereof.

One byte (B1) is allocated in each STS-1 for a section error monitoring function. This function is a bit interleaved parity 8 (BIP-8) code using even parity. The section BIP-8 is calculated over all bits of the previous STS-N frame after scrambling. The computed BIP-8 is placed in the B1 byte of STS-1 No. 1 before scrambling. This byte is defined only for STS-1 No. 1 of an STS-N signal.

One byte (B2) is allocated in each STS-1 for a line error monitoring function. This function is also BIP-8 code using even parity. The line BIP-8 is calculated over all bits of the line overhead and STS-1 envelope capacity of the previous STS-1 frame before scrambling (total 801 bytes). The computed BIP-8 is placed in the B2 byte of the STS-1 before scrambling. This byte is provided in all STS-1 signals within an STS-N signal. The N-line BIP-8 bytes in an OC-N signal are intended to form a single error monitoring facility capable of measuring error rates up to $10^{-3}$ independent of the value of N. The parity errors detected by the N BIP-8 detectors, or equivalently, the single BIP-8 N detector, should be accumulated into a single error count for the OC-N line.

One byte (B3) is allocated for a path error monitoring function. This function is also a BIP-8 code using even parity. However, the path BIP-8 is calculated only over all bits of the previous STS SPE before scrambling (total 783 bytes).

Although these line error monitoring functions may be appropriate for line monitoring, they are not necessarily effective for satisfying a need which exists for efficiently monitoring transport of data and overhead between modules within network elements.

DISCLOSURE OF THE INVENTION

An object of the present invention is to provide a SONET element internal transport format.

Another object is to provide a transport format which enables a simplified cross-connect implementation for a network element.

Another object of the present invention is to provide an error monitoring function for inter-module transport within a SONET element.

According to the present invention, the data frame structure between the modules within the network element is chosen to be similar to the SONET STS-1 structured bus, except having some differences implemented in the section/line and path overhead locations. These differences are implemented to simplify error detection and to reduce interface complexity on the internal buses to implement a switching architecture for automatic protection systems, among others.

In further accord with the present invention, in STS mode, the H1, H2 pointers may take on any value to allow for easy STS cross-connect function; in virtual tributary/tributary unit (VT/TU) mode, the H1, H2 pointer is always set to a fixed value to allow an easy VT/TU cross-connect function. Although the invention is applicable to all the various mappings, the disclosure will be primarily made in terms of ANSI T1.105. It should be understood, however, that the invention is not restricted thereto. In the embodiment shown, the H1, H2 pointer is set to 522 in the VT mode.

In still further accord with the present invention, the internal bus protocol contains an error monitoring byte analogous to the SONET B2 byte, but it is odd parity instead of even parity and is used to monitor internal data path connection. Odd parity is chosen, according to the present invention, to detect permanent stuck at "0" or "1" failures, as well as random or deterministic bit errors in the line overhead and STS payload and loss of signal and loss of frame detection.

In still further accord with the present invention, two bytes are allocated for the internal bus for switching between redundant lines or modules within the network element. The definition and use of these bytes are described and claimed in the above-referenced copending application Ser. No. 887,156 now U.S. Pat. No. 5,740,157.

According to the present invention, each STS-1** interface contains a valid BIP-8 parity code in the B2 position of the STS-1 frame. This is referred to as B2*. The B2* byte is an odd parity BIP-8 (as opposed to the SONET B2 which is even parity), calculated over all bytes of the STS-1 line overhead and STS payload and provides in-service, full-time monitoring of the STS-1 link. Each STS-1** link uses B2* to identify a degradation of signal condition any of the 8 parallel bits. By monitoring B2*, the ability of each STS-1 to carry error-free payload is continuously evaluated. This technique allows for provision of STS-1 loss of signal and loss of frame detection mechanism, stuck at 0 and stuck at 1 fault detection on single or multiple lines, and permits identification of random or deterministic bit errors in the line overhead and STS payload. This information is available to the facility and equipment APS functions and to the maintenance functions. The B2* function provides the primary condition to APS to switch payload to a duplex equipment set for STS-1** interface failures and unprovisioned PBA removals.

Further to the present invention, B2* is detected and evaluated for all STS-1 receivers. A detected error in any of the 8 BIP error positions in an STS-1 frame is counted as a single STS-1 link error. The occurrence of a single error is latched in a single bit STS-1 error history register. This register is accessible to the local controller, can be read by the controller and reset by the controller. The detection of an STS-1** link error may be accompanied by a controller interrupt.

According still further to the present invention, STS-1 link errors also provide an input to an STS-1 status mechanism. This function provides an indication of the long term status of each STS-1 link. The function is implemented by an up/down non-rollover 5-bit counter (divide by 32). The counter counts down by 1 to zero (but not past zero) for each STS-1 frame received without an STS-1 link error. The counter increments by 4 to 32 (but not past 32) for each STS-1 frame received with an STS-1 link error. When the value of the counter exceeds 16, the STS-1 link is considered failed. This status is the B2* input to the equipment automatic protection switching function and a change of status of the B2* state is sent to the local controller as an interrupt event.

In further accord with the present invention, a frame pulse indicating the location of the A1 byte is transmitted from one module within the network element to the other. The existence of the frame pulse simplifies the receive interface of the internal bus, as no framers are needed. Since the data is transferred synchronously by using a clock between the internal modules and the cross-connect, according to the present invention, the internal bus data is not required to be scrambled.

In still further accord with the present invention, the internal bus has two overhead bytes in the first two byte positions for framing bytes, which are identical to SONET A1, A2 bytes. Receive interfaces within the network element for interfacing the internal bus may ignore the framing bytes and use the internal bus frame sync pulse.

In still further accord with the present invention, the internal bus has H1, H2 and H3 bytes which are identical to the SONET H1, H2, H3 bytes and in the same positions.

These and other objects, features and advantages of the present invention will become more apparent in light of a detailed description of a best mode embodiment thereof, as illustrated in the accompanying drawing.

BRIEF DESCRIPTION OF THE DRAWINGS

FIG. 1 shows a transport format, according to the present invention, for STS payloads.

FIG. 2 shows a transport format, according to the present invention, for VT payloads.

FIG. 4 shows how FIGS. 4A and 4B fit together, and FIGS. 4A and 4B together show how, in STS mode, the H1, H2 pointer may take on any value and, in VT mode, the H1, H2 pointer is always set to a selected value to allow easy VT cross-connect functionality, according to the present invention.

BEST MODE FOR CARRYING OUT THE INVENTION

Figure 3:
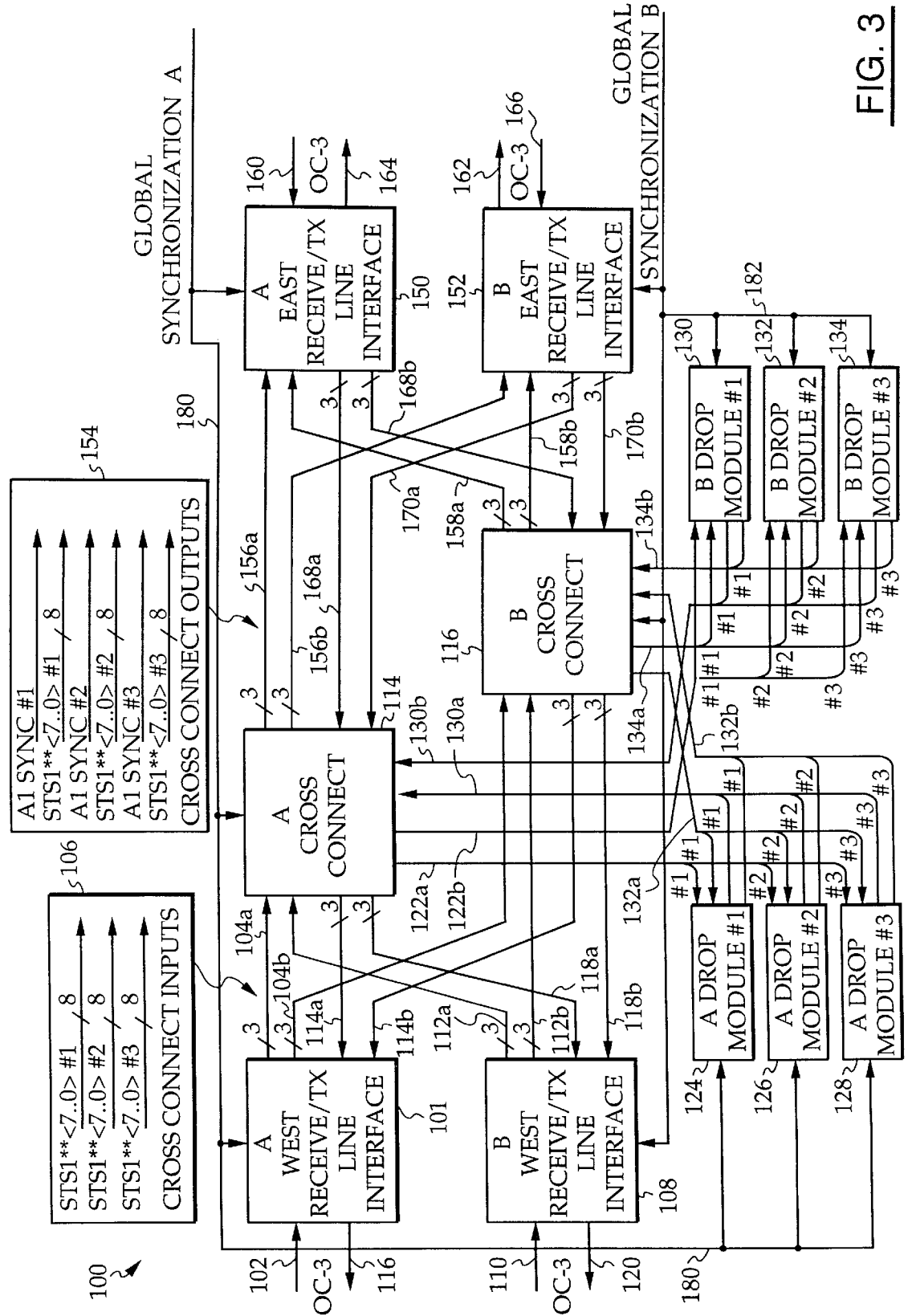
FIG. 3 shows internal details of a SONET network element, according to the present invention, having redundant A and B modules interconnected by an internal transport format, according further to the present invention.

According to the present invention, there are two types of internal payload mappings for SONET elements. We call our internal data transfer protocol the "STS-1" payload mappings which, as mentioned, are of two different types which we call STS (AU-32), as shown in FIG. 1, and VT (VT1.5, VT2, VT3, VT6; TU-11, TU-12, TU-21, TU-22) as shown in FIG. 2. Though not here, other mappings are not precluded. The STS-1 interface links, to be described below, require a minimum number of byte positions to be defined for each of these mappings. Immediately following, the byte definitions are provided for these payloads by row and column. STS-1 interfacing modules may define the payload and unused overhead bytes of their respective STS-1 links differently; therefore, it should be understood that various different modules which may use the STS-1** payload mappings described below will have sometimes more complete mappings to take advantage of unused overhead and payload bytes, as the case may be. The definitions contained herein form the basis of such more specific definitions.

Thus, FIG. 1 shows transmit and receive STS-1** payload mapping for STS payloads (AU-32 structure):
STS-1** Section Overhead Bytes for STS Payloads
1.1 A1*: First byte of STS-1 framing pattern with binary content 11110110. This is the same framing pattern as used by a SONET facility. It is created and inserted by all STS-1 generating modules. This byte is not explicitly needed by the new module designs used by the assignee's ADM 150 product because they derive frame synchronization from the STS-1 frame sync signal; however, it is included to provide compatibility with some existing ASIC designs of assignee, notably the assignee's STS1I ASIC which has A1, A2 framing capability but no ability to derive frame synchronization from the STS-1 frame sync signal.
1.2 A2*: Second byte of STS-1 framing pattern with binary content 00101000. This is the same framing pattern as used by a SONET facility. It is created and inserted by all STS-1 generating modules. This byte is not explicitly needed by the new module designs used by the ADM 150, because they derive frame synchronization from the STS-1 frame sync signal; however, it is included to provide compatibility with some existing designs, notably the STS1I ASIC which has A1, A2 framing capability but no ability to derive frame synchronization from the STS-1 frame sync signal.

1.3 C1*: The Signal Label byte C1 is not necessary for the operation of the STS-1 interface; however, some of assignee's existing ASICs which may be used in the ADM 150 automatically insert this value. Therefore, each STS-1 receiver should be capable of ignoring this value. If a byte is generated in this position, it should be a binary 00000001.

2.1 B1*: Not necessary for the operation of the STS-1 interface; however, the B1 byte position should not be used by STS-1 interfacing modules if interfacing ASICs such as the STS1I device, where the ASIC cannot be provisioned to stop generating the B1 value. All STS-1 receivers shall be capable of ignoring any value in this position.

2,2: Not necessary for the operation of the STS-1** interface. This position can be used to transport the orderwire byte E1 or any other information which has been mutually agreed on by all connecting module requirements.

2.3 Not necessary for the operation of the STS-1** interface. This position can be used to transport the user byte F1 or any other information which has been mutually agreed on by all connecting module requirements.

3,1; 3.2; 3.2: Not necessary for the operation of the STS-1** interface. This position can be used to transport the Datacom bytes D1–D3 or any other information which has been mutually agreed on by all connecting module requirements.

STS-1** Line Overhead Bytes for STS Payloads 4.1 H1*: First STS pointer bytes. The pointer is generated by all modules which source an STS-1 payload path or which perform STS-1 pointer processing. The pointer is not used by the STS-1 interface; however, it is a component of all STS-1 payloads and appears at all STS-1 interfaces. The pointer value generated by all pointer processing modules carrying STS-1 level payloads will be in the range of 0 to 782. The pointer value generated from all modules sourcing an STS-1 path shall have a fixed value of 522. (Note that all VT sourcing drop modules are also STS-1 path sourcing modules and shall insert the STS-1 pointer value of 522. This will be explained below in more detail in connection with FIGS. 4A and 4B**.)

4,2 H2*: Second STS pointer byte. The pointer is generated by all modules which source an STS-1 payload path or which perform STS-1 pointer processing. The pointer is not used by the STS-1 interface; however, it is a component of all STS-1 payloads and appears at all STS-1** interfaces. The pointer value generated by all pointer processing modules carrying STS-1 level payloads will be in the range of 0 to 782. The pointer value generated from all modules sourcing an STS-1 path shall have a fixed value of 522. (Note that all VT sourcing drop modules are also STS-1 path sourcing modules and shall insert the STS-1 pointer value of 522.)

4.3 H3*: Pointer action byte. Active; in the event of a negative justification, it carries the extra synchronous payload envelope (SPE) byte.

5,1 B2*: Internal interface link BIP-8. B2* is analogous to the line B2, but is odd parity instead or even and is used to monitor internal datapath connections between modules. It is generated and terminated by all STS-1** module interfaces. The rationale for the use of odd parity and the use of the B2* byte will be more fully disclosed below.

5,2 K1*: First internal link APS byte. It carries the 3-bit STS-1 select request commands which allow the STS-1 interfacing modules to request an APS switch event between STS-1 interfaces from redundant equipment. It is generated on all STS-1 module interfaces and must be terminated by all STS-1** interfacing modules. The K1* byte also has 5 bits allocated for transporting a physical connection verification identifier. This feature is more fully disclosed in the above-referenced copending application Ser. No. 887,156, now U.S. Pat. No. 5,740,157.

5.3 K2*: Second internal link APS byte. It carries the STS-1 status indications from the STS-1 selecting module back to the STS-1 select request module. This status is an essential feature in extending equipment protection throughout a module and are necessary to complete a switch event between signals coming from redundant equipment. It is generated on all STS-1 interfacing modules and must be terminated by all STS-1** interfacing modules. See the above-cited application Ser. No. 887,156, now U.S. Pat. No. 5,740,157.

6.1–8,3: Not necessary for the operation of the STS-1** interface. This position can be used to transport the Datacom bytes D4–D12 or any other information which has been mutually agreed on by all connecting module requirements.

9,1; 9,2: Not necessary for the operation of the STS-1** interface. This position can be used to transport the growth channel bytes Z1 and Z2 or any other information which has been mutually agreed on by all connecting module requirements.

9,3: Not necessary for the operation of the STS-1** interface. This position can be used to transport the orderwire byte E2 or any other information which has been mutually agreed on by all connecting module requirements.

STS-1** Payload Bytes for STS Payloads

None of the STS-1 payload bytes, including the STS-1 path overhead are generated, terminated, modified or observed by the STS-1** interfaces. Conventions for the definitions of these bytes shall be handled in the requirements for the modules handling these payloads.

STS-1** Payload Mapping for VT Payloads

Referring now to FIG. 2, there is shown a transmit and receive STS-1 payload mapping for VT-oriented payloads (AU-32 structure). In the figure, "R" indicates a VT reserved byte position. STS-1 interfaces carrying VT payloads have the same section overhead byte definitions as for STS payloads. As for line overhead, there are the same also, with the exception of the pointer bytes H1, H2 and H3. The definitions for these bytes change with the definitions given below:

4.1 H1*: First STS pointer byte. The STS pointer is generated by all modules which source an STS-1 payload path or which perform STS/VT pointer processing. The pointer is not used by the STS-1 interface; however it is a component of all STS-1 payloads and appears at all STS-1** interfaces. The STS pointer value generated by all STS/VT pointer processing modules carrying STS-1 level VT payloads will be 522. The pointer value generated from all modules sourcing an STS-1 VT path shall have a fixed value of 522. (Note that all VT sourcing drop modules are also STS-1 path sourcing modules and shall insert the STS-1 pointer value of 522.) The most significant four bits carry the NDF with a binary value of 0110. The next most significant two bits carry 00.

4.2 H2*: Second STS pointer byte. The STS pointer is generated by all modules which source an STS-1 payload path or which perform STS/VT pointer processing. The pointer is not used by the STS-1 interface; however it is a component of all STS-1 payloads and appears at all STS-1** interfaces. The STS pointer value generated by all STS/VT pointer processing modules carrying STS-1 level VT payloads will be 522. The pointer value generated from all modules sourcing an STS-1 VT path shall have a fixed value of 522, as shown in the Table below.

TABLE I

| 0 1 1 0 0 0 1 0 | 0 0 0 0 1 0 1 0 |
|---|---|
| NDF | value = 522 |

4,3 H3*: Not necessary for stuffing operation, the H3 byte shall be generated with a fixed value =00000000 by all STS-1** in VT mode.

STS-1** Payload Bytes & STS Path Overhead for VT Payloads

None of the STS-1 payload bytes, including the STS-1 path overhead are generated, terminated, modified or observed by the STS-1 interfaces. The position of the STS path overhead bytes and reserved columns are shown in the STS-1 VT payload figure in their appropriate positions relating to an STS pointer value of 522. Conventions for the definitions of the STS path overhead and VT payloads shall be described in the requirements for the modules handling these payloads. The only STS-1 associated requirement for the STS path overhead for VT payloads is that the H4 byte in all STS-1 receive (toward their cross-connect) interfaces carrying VT payloads synchronize their H4 values to the 2 kHz global frame sync.

Turning now to FIG. 3, an internal architecture for a network element 100 is shown. An "A" west receive/transmit line interface 101 is responsive to an OC-3 SONET signal at 155.52 Mb/s for providing redundant A and B signals on lines 104a, 104b having the transport format of FIGS. 1 or 2, depending on whether the signal is to be handled as an STS signal or a VT signal. Thus, FIG. 3 shows a block 106 that is descriptive of the manner in which the signal on the line 102 incoming to the "A" west line interface 101 is provided as three separate STS-1** signals, each being provided as eight separate parallel lines so that the signal may be transported within the network element as three separate STS-1 signals, each having a rate of 155.52 divided by three divided by eight or 6.48 Mb/s.

Similarly, a "B" west receive/transmit line interface 108 is responsive to an OC-3 SONET signal on a line 110 and, in response thereto, provides three separate STS-1** signals on a line 112a, all being eight bit parallel signals at the 6.48 Mb/s rate. A redundant set of similar signals are provided on a line 112b. The "B" west receive/transmit line interface 108 is a backup interface. The signal on the line 110 is a duplicate of the signal on the line 102 and for redundancy.

Each of the line interfaces 101, 108 provides one of its outputs to an "A" cross-connect 114 and the other to a "B" cross-connect 116. Thus, the "A" cross-connect 114 is responsive to the signal on the line 104a from A interface 101 and to the signal on the line 112a from the B interface 108. Similarly, the B cross-connect 116 is responsive to the signal on the line 104b and the signal on the line 112b from the primary and secondary interfaces 101, 108, respectively.

The A and B interfaces 101, 108 are also responsive to redundant signals coming in the opposite direction from the A and B cross-connects 114, 116. Thus, the A west receive/transmit line interface 101 is responsive to three STS1 signals on a line 114a from the A cross-connect 114 and three duplicate STS1 signals on a line 114b from the B cross-connect 116. In response to one of the signals, the A west receive/transmit line interface 101 provides a serial SONET signal at the OC-3 rate on a line 116 for transmission within the network. Similarly, the B west receive/transmit line interface 108 is responsive to three STS1 signals on a line 118a from the A cross-connect 114 and three duplicate STS1 parallel signals on a line 118b from the B cross-connect 116. In response to one of these signals 118a, 118b, the B west receive/transmit line interface 108 provides a SONET serial signal on a line 120 which is a duplicate of the signal on the line 116.

The A cross-connect 114 provides a set of redundant drop signals on lines 122a, 122b. The drop signal on the line 122a goes to a plurality of "A" drop modules 124, 126, 128 and the drop signal on the line 122b goes to a plurality of duplicate "B" drop modules 130, 132, 134. These signals to and from the drop module are STS-1** signals in VT or STS mode, depending on the type of drop module installed. The details of the cross-connect is not relevant to the presently claimed invention although details of a similar device may be found in U.S. Pat. No. 5,014,268 entitled "Parallel Time Slot Interchanger". The details of a receive line interface are shown in copending application Ser. No. 886,755 abandoned in favor of Ser. No. 176,309, now U.S. Pat. No. 5,717,693.

Each of the drop modules 124, 126, 128 drops the STS-1 signals provided to them from the cross-connect to subscribers or lower level modules. Similarly, in the reverse direction, they receive signals from subscribers and, in response, provide STS-1 signals on a line 130a to the A cross-connect 114. Similarly, the B drop modules 130, 132, 134 provide an STS-1 signal on a line 130b to the cross-connect 114. Duplicate signals to and from the A drop modules are provided to and from the B cross-connect 116 on lines 132a, 132b and similar backup signals are provided from and to the B cross-connect on lines 134a, 134b to and from the B drop modules 130, 132, 134. The A and B cross-connects 114, 116 are also interfaced to a pair of A and B west interfaces 150, 152 by means of the STS-1 data transfer protocol, according to the present invention, as shown in a box 154 summarizing three separate eight bit parallel buses making up a signal line 156a between the A cross-connect 114 and the A west receive/transmit line interface 150. In response to the signal on the line 156a or to a duplicative signal on a line 158a from the B cross-connect 116, the A west receive/transmit line interface 150 provides an OC-3 SONET signal on a line 160 for transport within the network. Similarly, the B east receive/transmit line interface 152 is responsive to an STS-1** signal on a line 156b which is duplicative of the signal on the line 156a and is also responsive to a signal on a line 158b being duplicative of the signal on the line 158a for providing a signal on a line 162 being a duplicate of the signal on the line 160.

In the receive direction, the A and B east receive/transmit line interfaces 150, 152 are responsive to duplicative incoming SONET signals on lines 164, 166, respectively. Each interface 150, 152 provides three eight bit parallel signals in duplicate in the STS-1 format. Thus, the A east interface 150 provides a signal on a line 168a to the A cross-connect 114 and a signal on a line 168b to the B cross-connect 116. Similarly, the B east interface 152 provides, in response to the signal on the line 166, three eight bit parallel signals on a line 170a in the STS1 format to the A cross-connect and a duplicate such signal on a line 170b to the B cross-connect 116.

Each of the devices shown on the A side of FIG. 3 are responsive to a global synchronization signal on a line 180 and each of the B side devices are responsive to a duplicative global synchronization signal on a line 182. The two duplicate global sync signals are synchronized together from redundant clock modules (not shown).

The details of the redundant architecture and its management function are disclosed in copending application Ser.

No. 887,156 now U.S. Pat. No. 5,740,157 and will not be discussed herein in detail. Suffice it to say, that the architecture shown in FIG. 3 permits a nested switching of inoperative hardware wherein, for example, if the A cross-connect 114 is detected to be inoperative the B cross-connect will be used to respond to the signal on the line 104b and the signal on the line 132b for providing the signal on the line 158a. This is distinguished from the prior art of non-SONET automatic protection switching wherein if a component within an A or B path were detected bad it would switch completely to the other side. The presently disclosed approach allows a more flexible and powerful sharing of components which increases the automatic protection capabilities of the system.

Thus, it will be seen that the data transfer protocol between the facility interfaces 101, 108, 150, 152, 126, 182, 130, 132, 134 and the cross-connects 114, 116 have been described.

Turning now to FIGS. 4A and 4B which fit together as shown in FIG. 4, an illustration is there shown of the A cross-connect 114 of FIG. 3, with the "A" and east and west receive line interfaces 150, 101 respectively, of FIG. 3 interconnected thereto. The block 106 of FIG. 3, although not shown again, is equally applicable here in the three STS-1** buses on the line 104a. Also not reproduced is the block 154 of FIG. 3 showing the structure of the bus 156a, but which is applicable in FIGS. 4A and 4B as well. The "A" drop module #1 124 is also shown.

The incoming SONET OC-3 signal on the line 102 may be configured in the network to be in STS mode or VT mode for each of the STS-1s independently. Assuming that one of the lines is in STS mode, as shown in a block 184, for example, and the other two in VT mode, as shown in two other example blocks 185, 186, a pointer processing step as carried out by the west receive line interface 101 will now be discussed. It will be observed that the block 184 shows the synchronous payload envelope 184a positioned at an arbitrary position within the frame 184, which we shall call the "A" position, as pointed to by the H1, H2 pointer, i.e., the H1, H2 pointer is set to value of A which points to the byte position at the upper left-hand corner of the SPE where the J1 byte is located at the very beginning of the SPE. As indicated in the block 184, the payload is carrying VTs which we may assume are VT1.5s and the V1, V2 pointer has a value of "C". It should be noted that the SPE may carry other payloads, such as DS-3 when in STS mode. This part of the signal on the line 102 is processed within the line interface 101 in STS mode. The interface 101 then provides a signal on the line 104a in a frame 187 which had to be shifted in time in order to enable the line interface 101 to line up the other two signals from the line 102, after processing, onto the line 104a, as indicated by frames 188, 189, along with frame 187 being "shifted up", which represents, in the figure, a shifting in time in the signal on the line 104a with respect to the blocks 184, 185, 186 on the signal line 102. This is a delay time which, depending upon the mode, is accounted for in various pointer adjustments. In other words, in the STS mode, since the frame 187 is shifted in time with respect to the frame 184, in order to maintain the position of the payload in time, the pointer H1, H2 has to be changed to a new value which we shall call "X", as indicated. The V1, V2 pointer still keeps the value equal to "C", which has the effect of keeping the payload in the same relative time position as to when it came into the interface 101. This is due to the fact that in STS mode, the STS SPE is always left unchanged. This is indicated in the figure by having the V1 and V5 bytes shown at the same horizontal position. Although the payload 184a has changed its relative position within frame 187 as compared to where it was within frame 184, the position of the payload in time is substantially the same, except for delays introduced in the interface 101. A grooming example is shown for the payload 184a cross-connected into the STS-1 No. 2 position, as shown in a frame 190, representing the No. 2 STS-1 bus on the line 156a before being further processed by the east receive line interface 150. In this case, the H1, H2 pointer is the same, and so is the V1, V2 pointer. In other words, the entire STS-1** frame has been cross-connected from the first bus position on the left of the cross-connect to the second bus position on the right of the cross-connect, as indicated by a line 190a.

A payload 191 within the frame 185 has an H1, H2 pointer equal in value to "B", and we shall assume that the VTs are all starting at the same relative position within each of the VTs, for the sake of simplicity. Thus, each VT starts at a byte position having a value "D", as pointed to by the V1, V2 pointer. Since, as we have indicated previously, it is desired, according to the present invention, to cause the VT pointers to be lined up for all VTs going into the cross-connect. This will be affected by, as shown in the block 188, selecting a fixed value such as 522 for the H1, H2 pointer and causing the V1, V2 pointer to take on a new value such that they change to account for the change. Thus, in frame 188, the V5 bytes, which may all be assumed to be in the byte No. 4 position of the STS-1 SPE, i.e., in the same row as the B3 byte covering columns 2–29 of the SPE (for purposes of simplicity of explanation) the V1 pointer now has to take on a new value of "Y" to properly point to the V5 bytes which remain in the same relative position in time as in the frame 185, but which have been maneuvered around by the frame 188 in order to cause their payloads to be in the appropriate columns, with pointers aligned. Any of these columns may be cross-connected at will to other STS-1 buses or to the drop modules. For example, the first column is shown being cross-connected as indicated by a line 192a to a frame 192 into one of the columns thereof. The pointer is also transferred along with the VT, as indicated. Similarly, the second column may be cross-connected as indicated by a line 193a into a frame 193 representing another one of the STS-1 buses on the line 156a. The V1, V2 pointer value of "Y" is also provided along with the column and the other two columns for that particular VT which will be transmitted later on in the frame.

The third payload column within the frame 188 is shown being cross-connected as indicated by a line 194 to the drop module 124 on a line 124a, the structure of the signal on the line 124a being shown in a frame 194a. As indicated, the V1, V2 pointer retains the value of "Y" which it obtained in the pointer processing of the line interface 101, as did the other VTs cross-connected elsewhere as indicated on the lines 192a, 193a previously.

A payload 186a as shown within the frame 186 is similarly processed in VT mode by the line interface 101, as indicated in a frame 189. The V5 bytes are shown within the frame 189 as occupying approximately the same relative position in time, but the pointers have had to be adjusted to account for the adjustments required due to the lining up of the VTs in columns within the frame as forced by the H1, H2 pointers being set to 522. The new V1, V2 pointer is set equal to a new value of "Z", and this value is cross-connected along with particular columns into other signal paths, as indicated by, for example, a line 195 and a line 196. The column cross-connected as indicated by the line 195 is provided on the line 156a within the frame 193, as indicated, with the V1, V2 pointer value of "Z". Similarly, the line 196 indicates a cross-connecting of a VT column to the drop module 124 wherein the new "Z" V1, V2 pointer value is transferred along with the VT itself.

The drop module 124 is also capable of providing signals in the upstream direction to the cross-connect 114, as indicated by a frame 197 having VT columns cross-connected with a pointer value of "F" into the frames 193 and another into the frame 192 with the V1, V2 pointer retained. These cross-connections are indicated by cross-connection lines 197a, 197b.

A description will now be provided as to a particular error monitoring function, according to the present invention, wherein odd parity is used over an odd number of bytes in a frame for detecting errors.

Figure 5A:
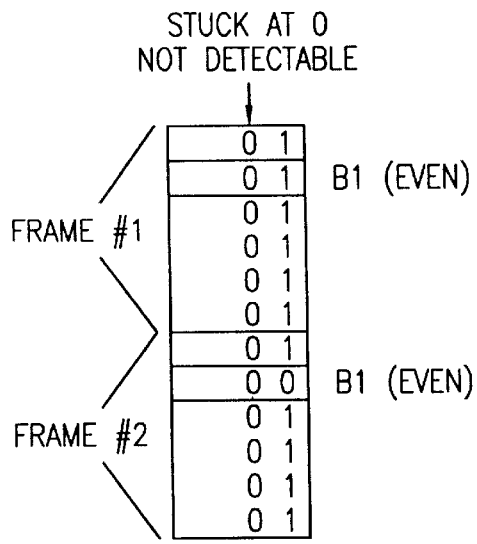
FIG. 5 shows even and odd parity calculated over an even number of bytes in a frame, wherein stuck at 0 and stuck at 1 are not detectable.

Turning now to FIG. 5(a) an approach that might have been tried but which is distinguished from the present invention is shown. The approach shown in FIG. 5(a) is to calculate even parity over an even number of bytes in the frame.

It should be realized, according to the present invention, that the error checking mechanism utilized in the embodiment shown in FIG. 3 utilizes error checking on every bit line of an eight bit parallel signal to achieve the equivalent of a bit interleaved parity eight code approach such as taken in the SONET specification. Although the approach taken utilizes the checking of individual parallel bits, however, the invention disclosed herein would be applicable if the internal transport format disclosed herein were implemented as a serial bus. It turns out that a serial bus exhibits the same problem. Thus, the description which follows is applicable to either parallel or serial approaches.

Figure 5B:
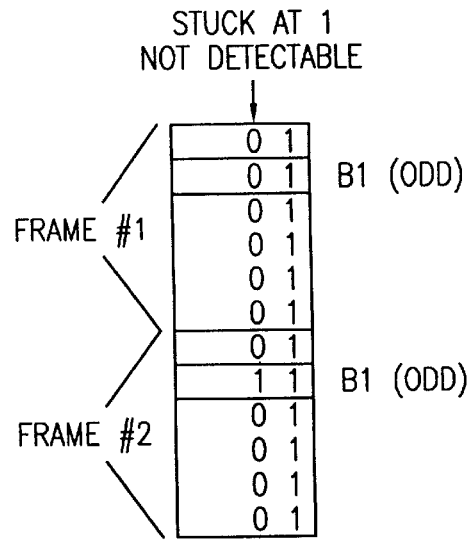

In FIG. 5(a) is shown two frames labeled frame 1 and frame 2 each having an even number of bytes, only two bits of which are shown. An all-zero condition with proper B2 is shown in the left-most bit and an all-one condition with proper B2 is shown in the right-most bit. Thus, using even parity over an even number of bytes, as in the B1 byte used in the SONET specification, it is not possible to detect a stuck at zero condition, as shown. This is because the summation of all of the zero bits in the left-most column, frame 1, yields zero and for even parity there would be no need to add anything and a zero would be entered in the B1 byte location in frame #2 and you would never be able to determine that there was something wrong on that bit line. On the other hand, the stuck at one condition could be detected because the right-most column normally has a 0 in B1 of frame 2, if all ones are present in the previous frame Turning now to FIG. 5(b), still calculating over an even number of bytes but this time odd parity, it will be seen that a similar condition exists as in FIG. 5(a) except that stuck at one is not detectable.

Figure 6A:
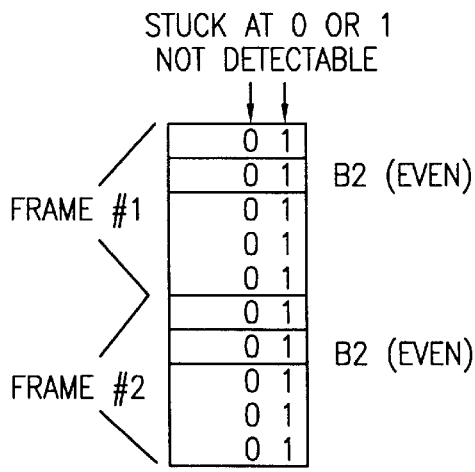
FIG. 6 shows, according to the present invention, in (a) how stuck at 0 or 1 are not detectable for even parity calculated over an odd number of bytes, but how in (b) such is detectable using odd parity calculated over an odd number of bytes.
Figure 6B:
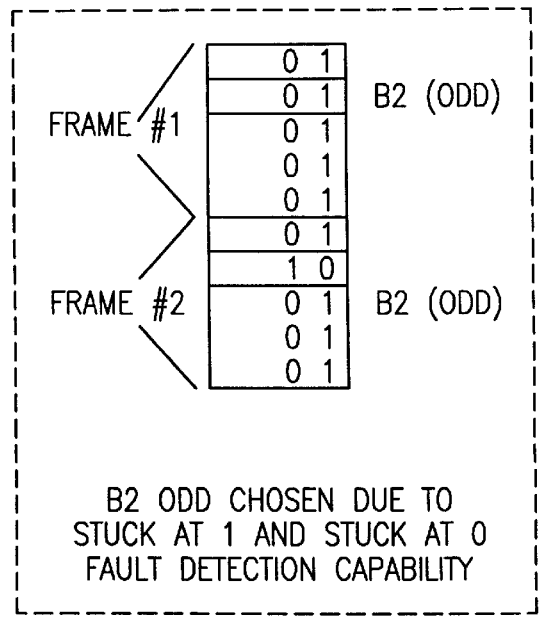

Turning now to FIG. 6(a) and (b), even and odd parity are shown calculated over an odd number of bytes, i.e., five bytes in a frame. In FIG. 6(a) it is seen not neither stuck at zero nor stuck at one are detectable. This would correspond to the approach taken for the B2 byte in the above-cited SONET specification. In FIG. 6(b), on the other hand, it will be seen that both stuck at one and stuck at zero may be detected using odd parity calculated over an odd number of bytes in a frame. Thus, according to the present invention, a byte labelled B2*, occupying a position similar to the B2 byte of the SONET transport format is utilized for fault detection using odd parity calculated over an odd number of bytes.

Figure 7:
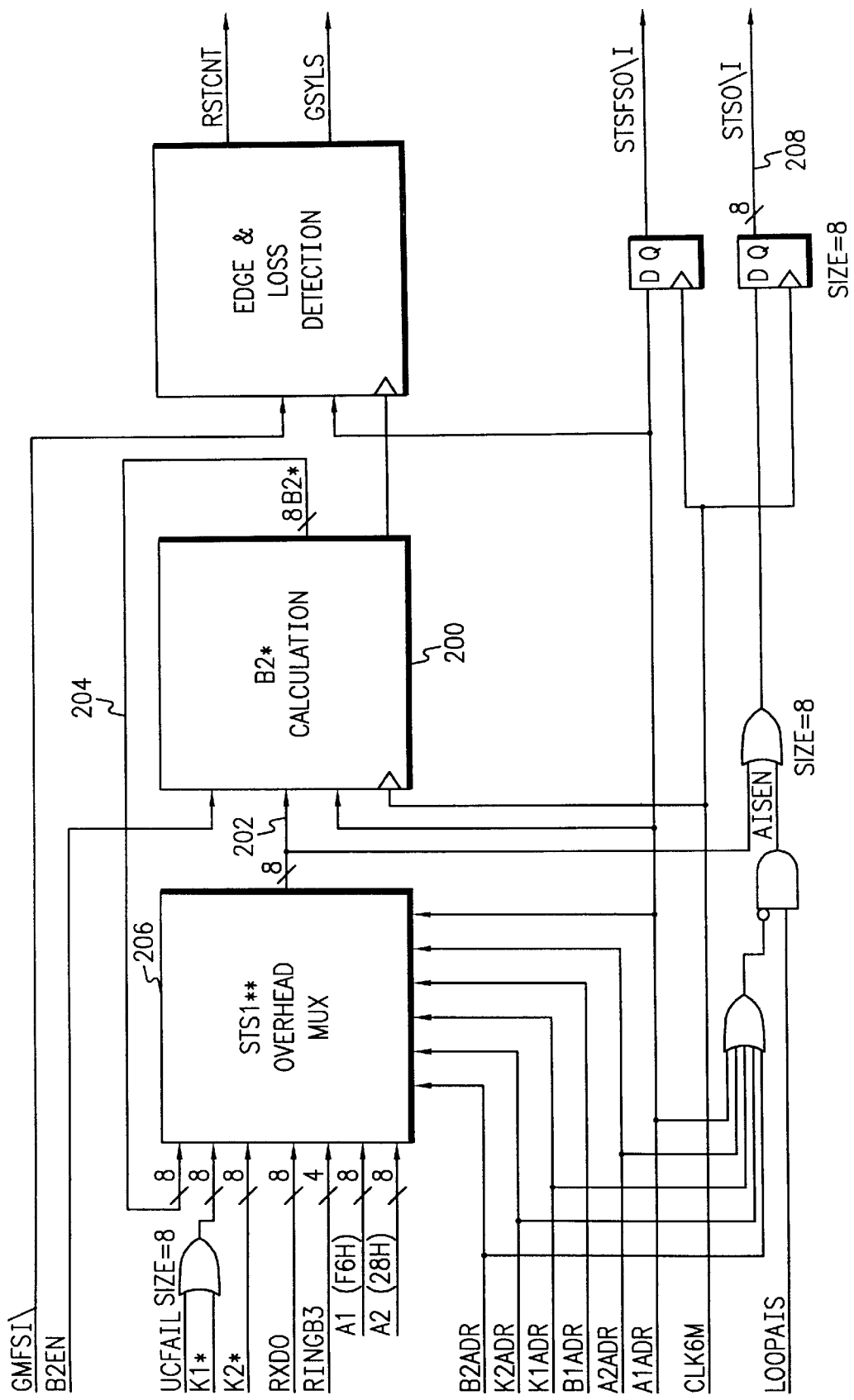
FIG. 7 shows STS-1 overhead insertion and retiming in an STS-1 output block.

Within each of the line interfaces 101, 108, 150, 152 and drop modules of FIG. 3 there will be an STS-1 overhead insertion and retiming block such as shown in FIG. 4D of copending application Ser. No. 886,755 abandoned in favor of Ser. No. 176,309 now U.S. Pat. No. 5,717,693 which provides, for example, one of the STS-1 signals on the line 104a. Such an overhead insertion and retiming block is shown in FIG. 7. The overhead bytes are inserted to the location as shown in FIG. 7 which includes a B2* calculation block 200 which is responsive to an odd number of bytes in each frame for performing the calculation indicated previously in connection with FIG. 6(b) except over all bytes of the STS-1 line overhead and STS payload. The calculation result is routed back to the STS-1 overhead mux 206 for insertion in the appropriate B2* byte position as indicated in FIG. 1. The signal on the line 202 is ultimately provided on a line 208 which will be equivalent to any one of the STS-1** signals on the lines 104a, 104b, etc., of FIG. 3.

Figure 8:
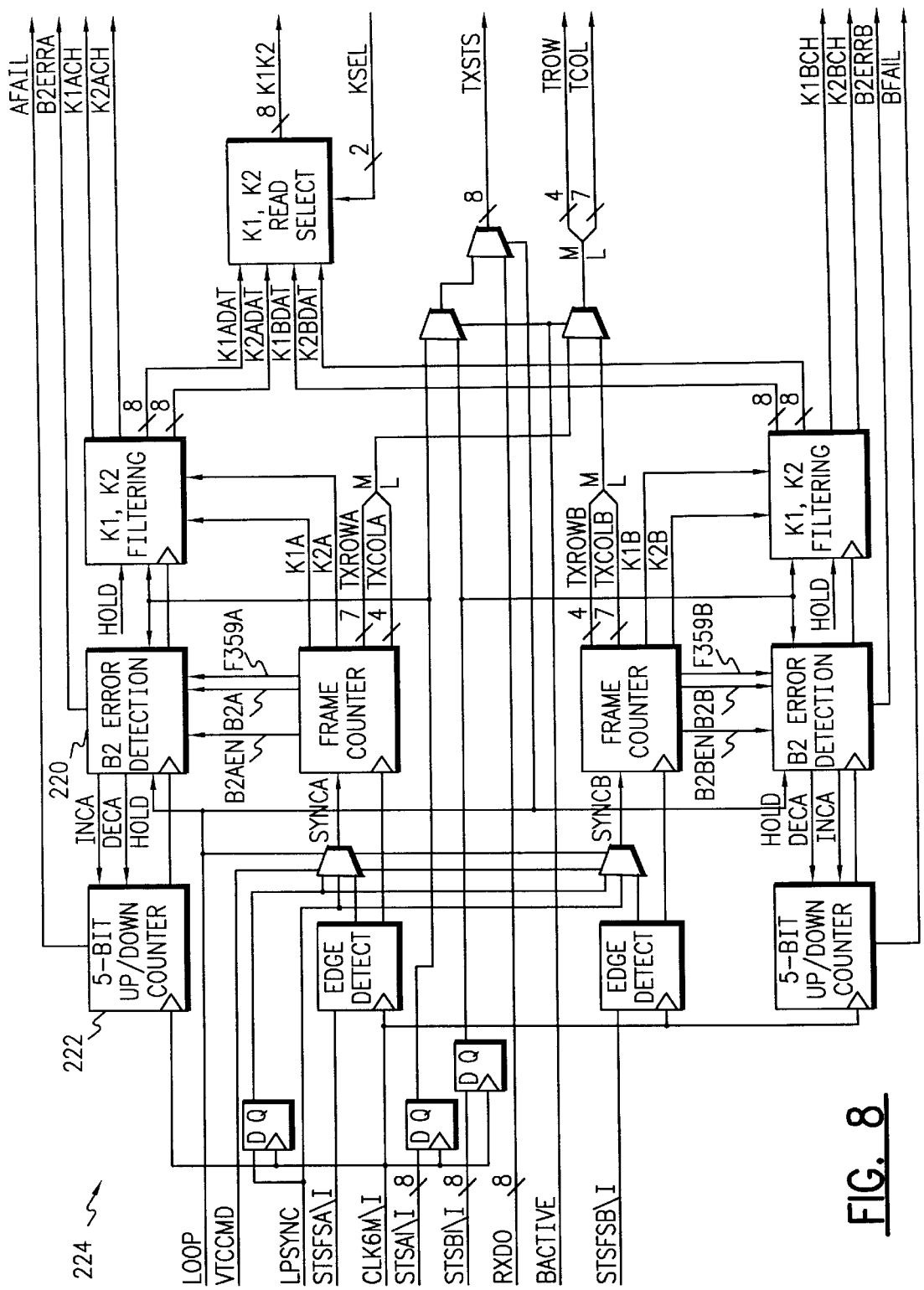
FIG. 8 shows B2 error detection in an STS-1** input block.

Turning now to FIG. 8, a transmit STS-1 selection circuit is shown wherein the received A and B side STS-1 data are processed for equipment protection and section, line and path overhead insertion. The A/B select multiplexer is controlled by a software equipment protection algorithm as disclosed in copending application Ser. No. 887,156 now U.S. Pat. No. 5,740,157. BACTIVE is provisioned by software. This algorithm uses the filtered K1* and K2* bytes and the B2* calculation performed as shown in FIG. 7 on both sides. FIG. 8 shows the STS-1 selection with three different synchronization sources for (1) STS-1 sync, (2) global sync, and (3) STS-1** loopback sync.

As previously mentioned, each STS-1 interface contains a valid BIP-8 parity code in the B2 position of the STS-1 frame. This B2 is referred to as B2* as shown in FIG. 1. As also mentioned, the B2* byte is odd parity BIP-8 calculated over all bytes of the STS-1 line overhead and STS payload and provides in service, full time monitoring of the STS-1 link.

At the receive end of an STS-1 link, an STS-1 status mechanism 220, 222, being part of a TX STS-1** receive circuit 224, as shown in FIG. 8, recalculates the B2* calculation and provides an indication of the long term status of each STS-1 link. The function is implemented by an up/down non-rollover five-bit counter 222 (divide by 32). The counter counts down by one to zero (but not past zero) for each STS-1 frame received without an STS-1 link error. The counter increments by four to thirty-two (but not past thirty-two) for each STS-1 frame received with an STS-1 link error. When the value of the counter exceeds 16, the STS-1 link is considered failed. This status is the B2* input to the equipment automatic protection switching function and a change of status of the B2* state is sent to the local controller as an interrupt event.

Figure 9A:
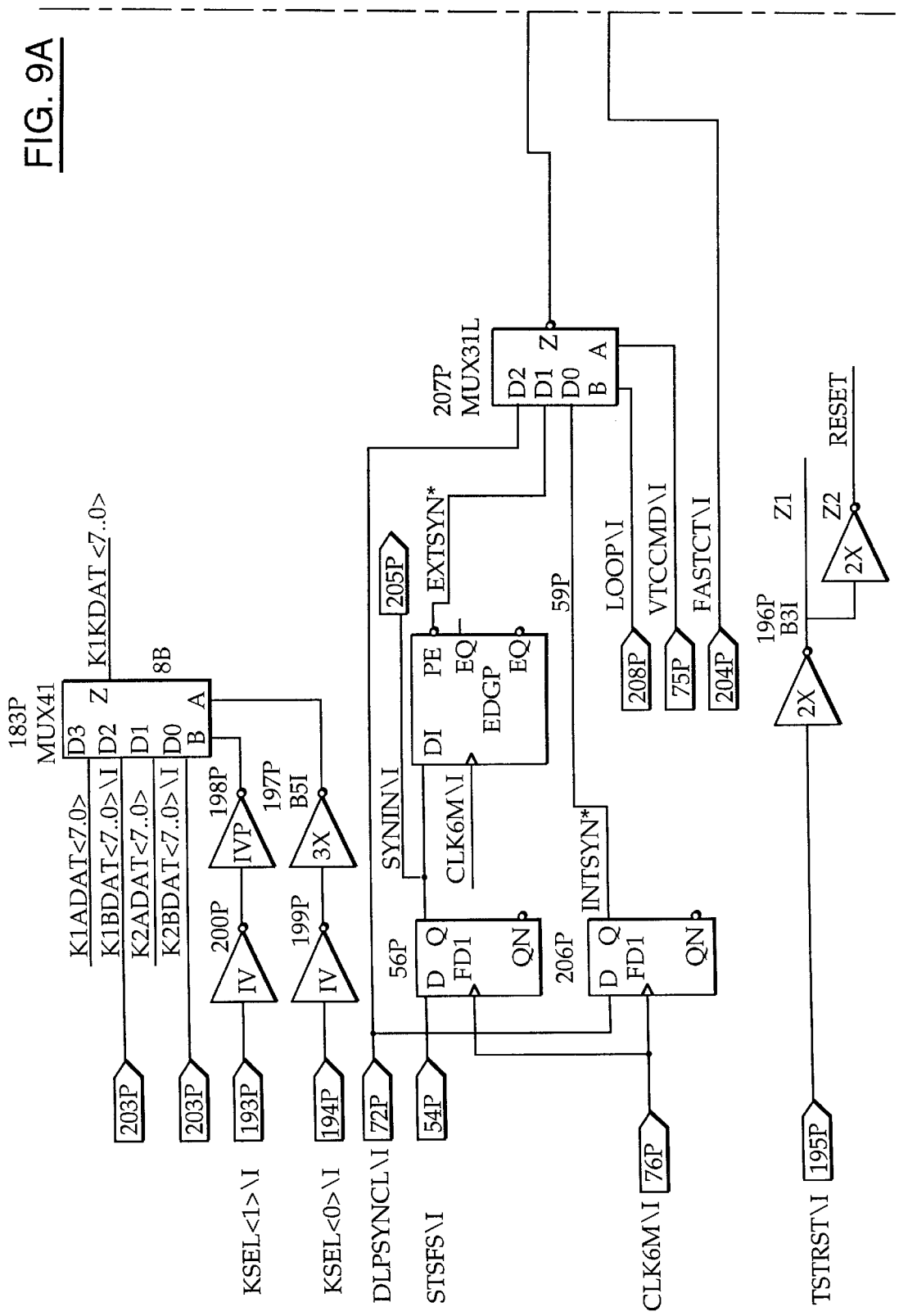
FIG. 9 shows how FIGS. 9A, 9B, and 9C fit together, and FIGS. 9A, 9B and 9C together show the A side of the STS-1 input block of FIG. 8**.
Figure 9B:
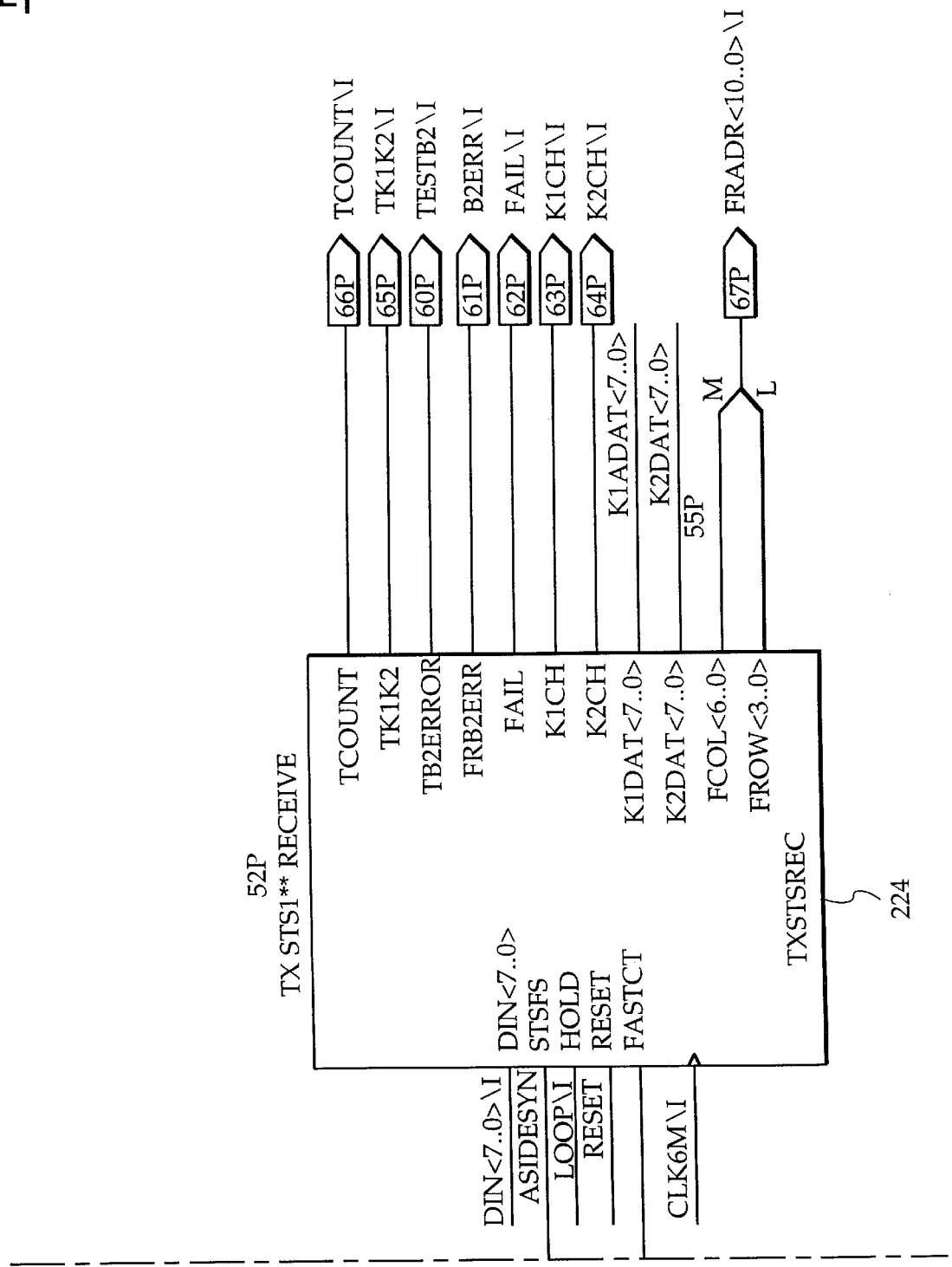
Figure 9C:
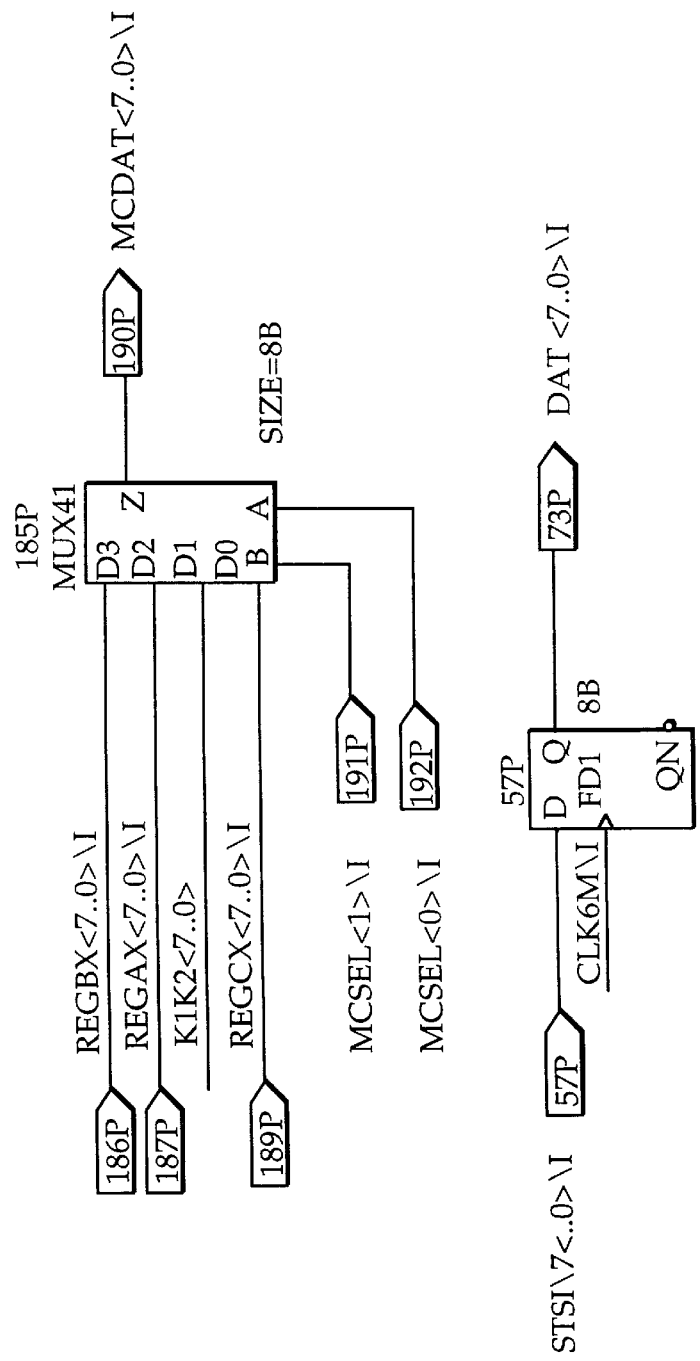
Figure 10:
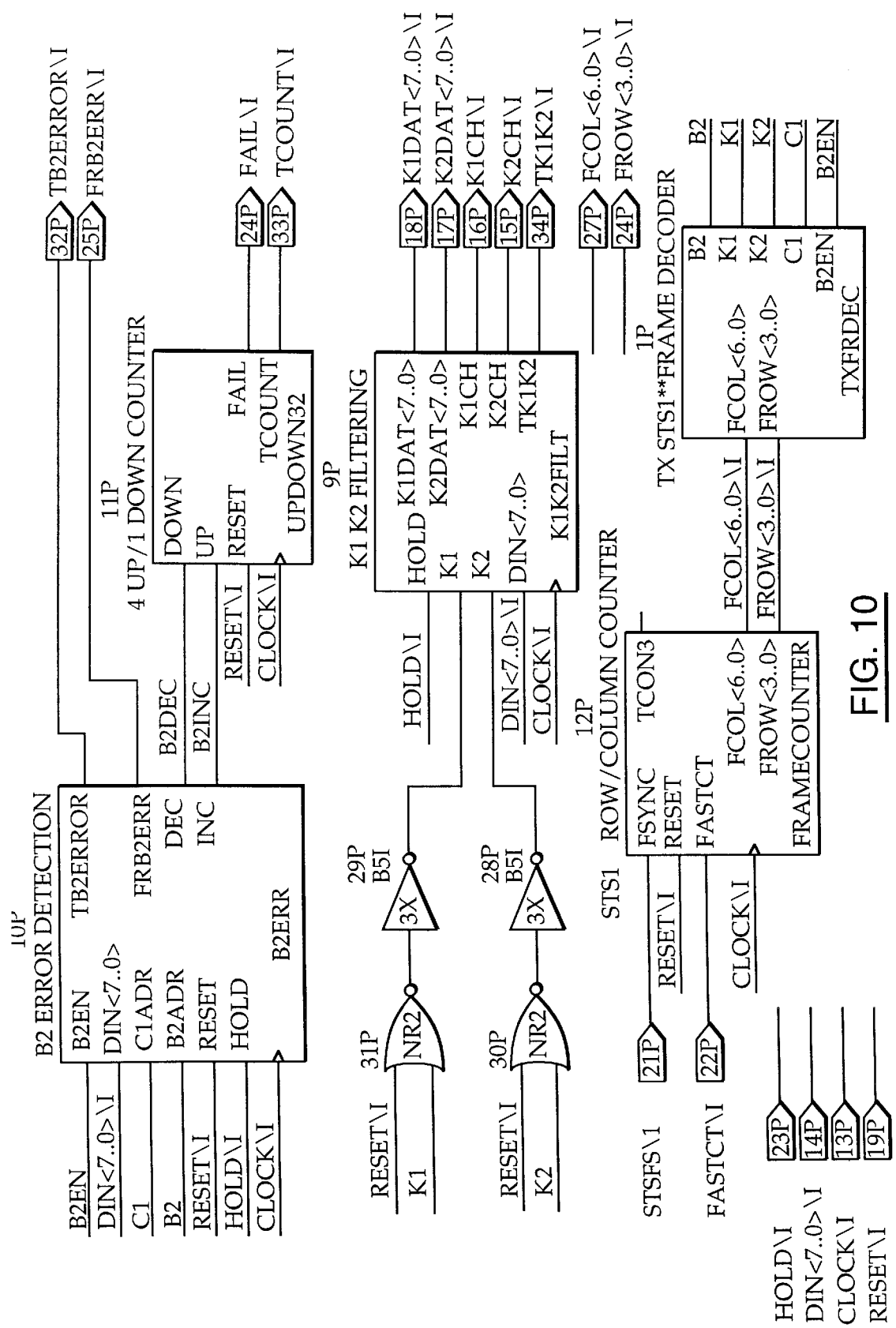
FIG. 10 shows the STS-1 input block (A side) of FIG. 9** in greater detail.
Figure 12A:
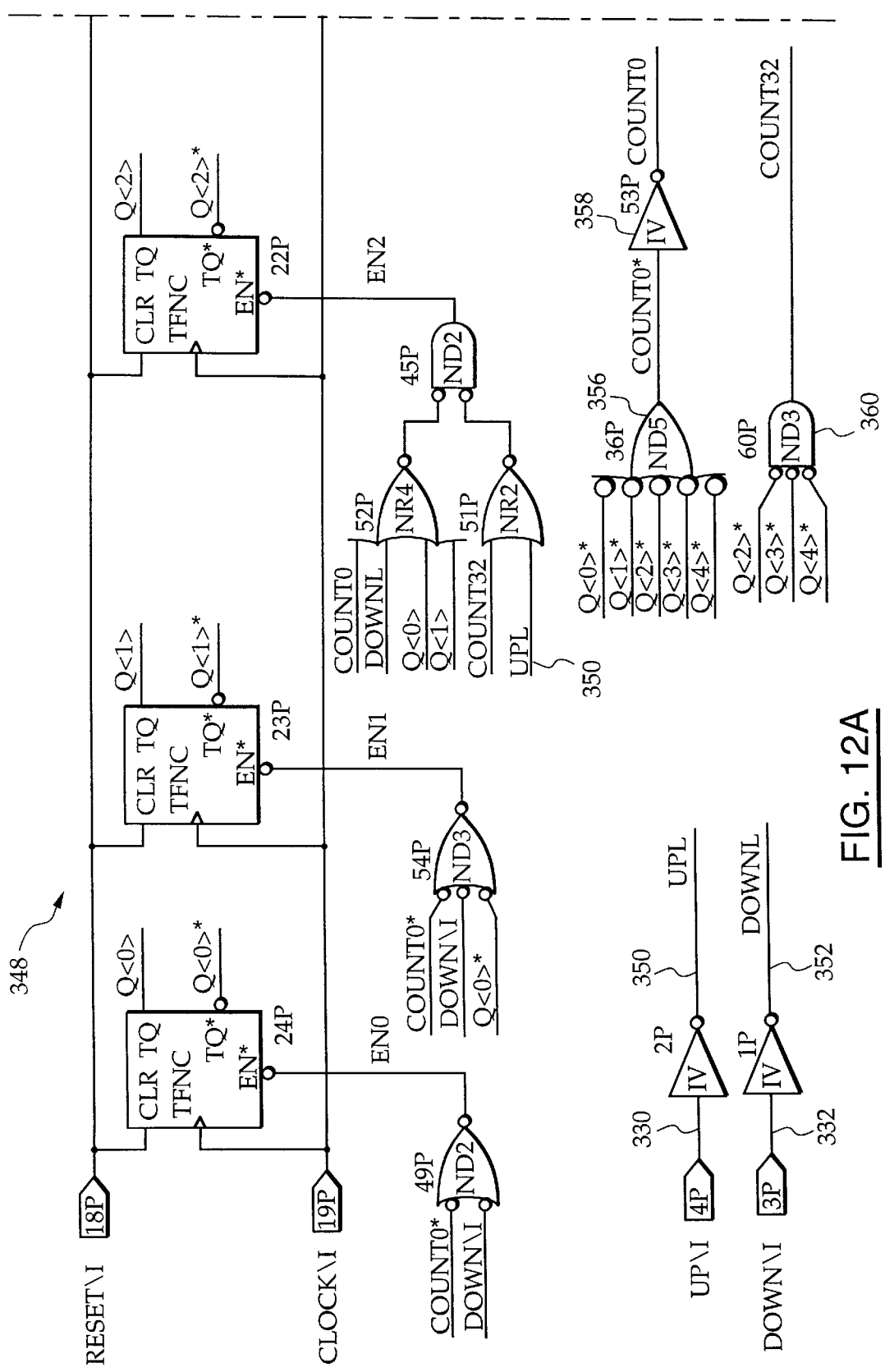
FIG. 12 shows how FIGS. 12A and 12B fit together, wherein FIGS. 12A and 12B together show the up/down counter block of FIG. 10 in greater detail.
Figure 12B:
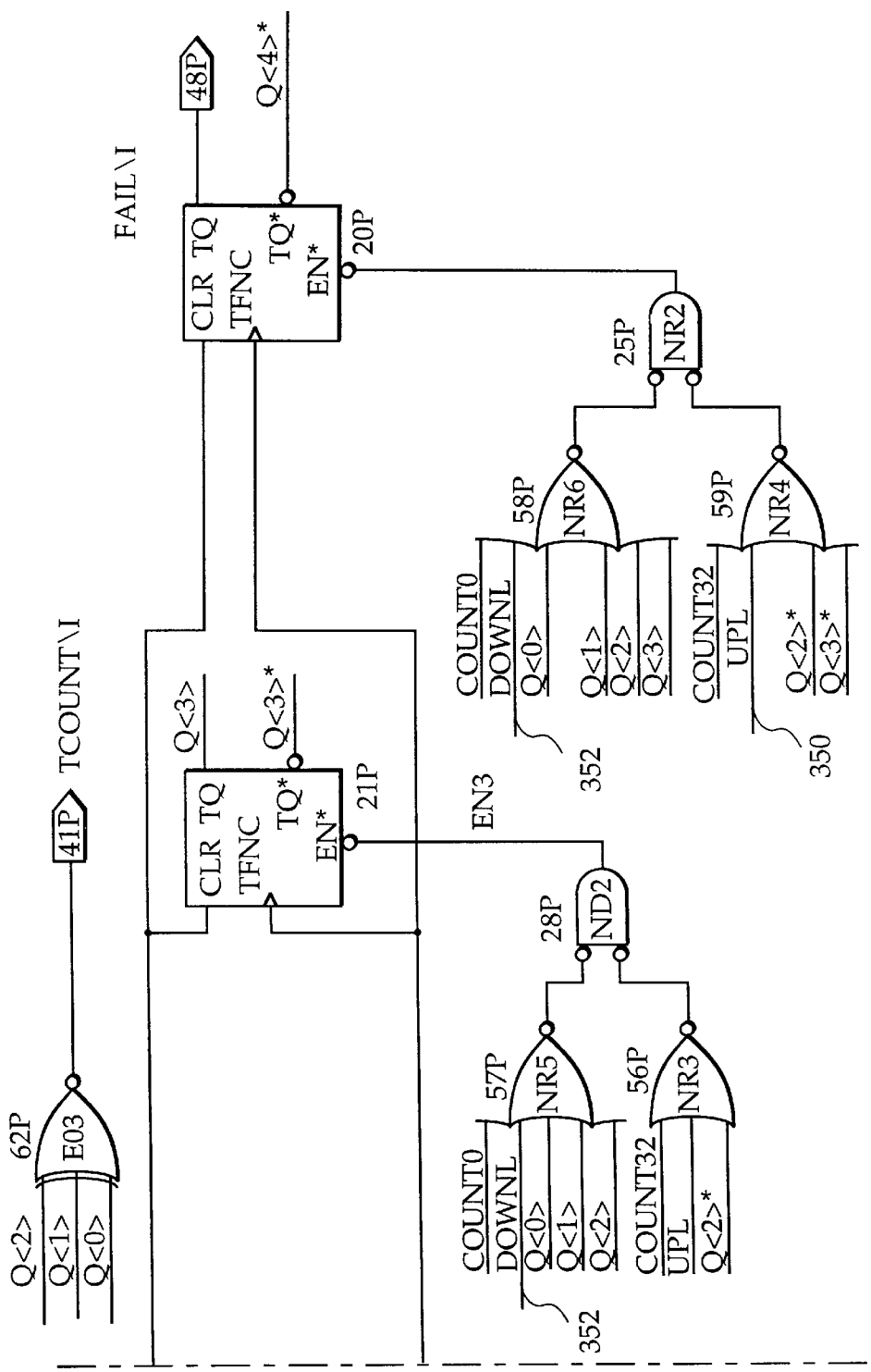
Figure 13A:
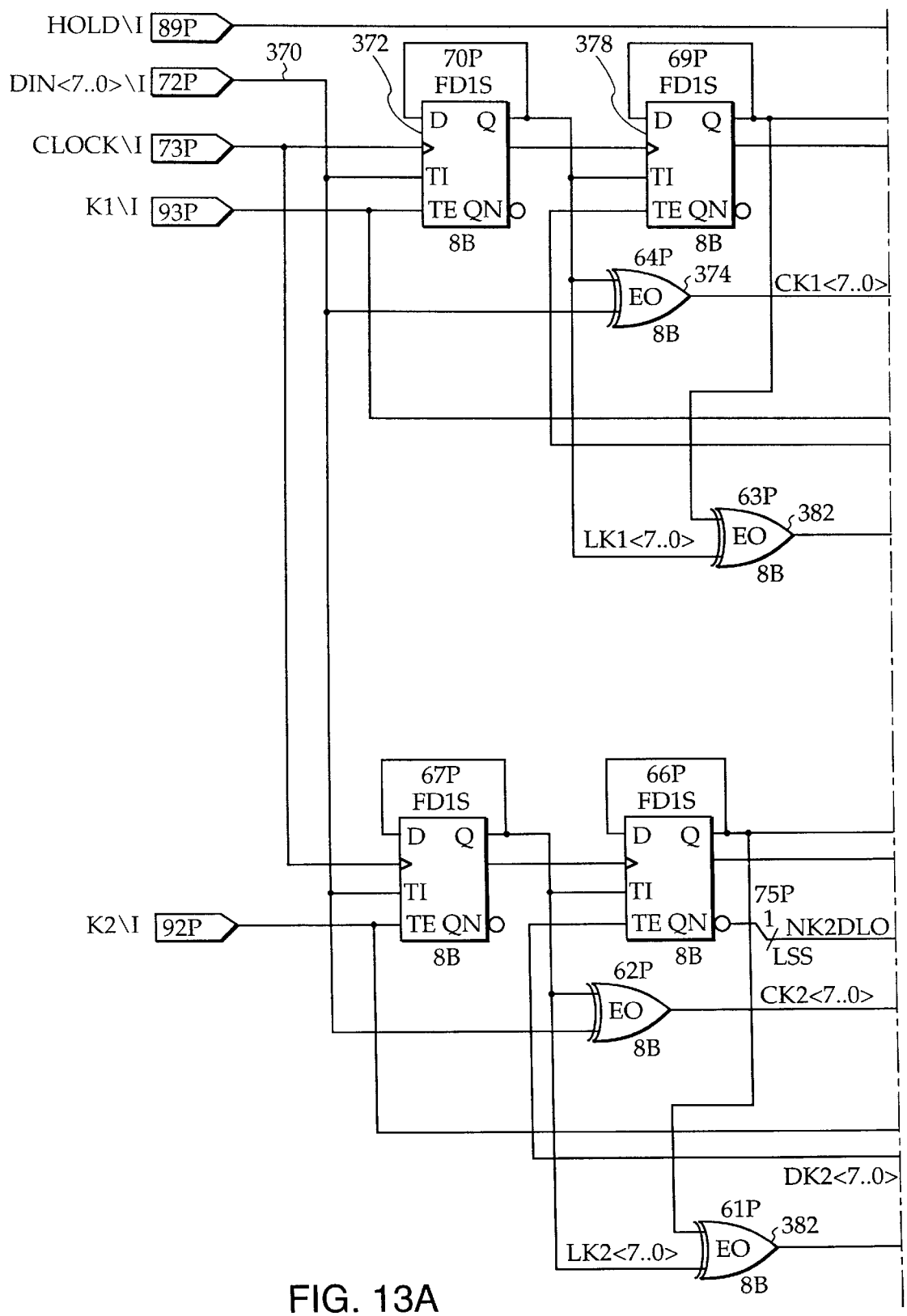
FIG. 13 shows how FIGS. 13A, 13B and 13C fit together, wherein FIGS. 13A, 13B and 13C together show the K1, K2 filtering block of FIG. 10 in greater detail.
Figure 13B:
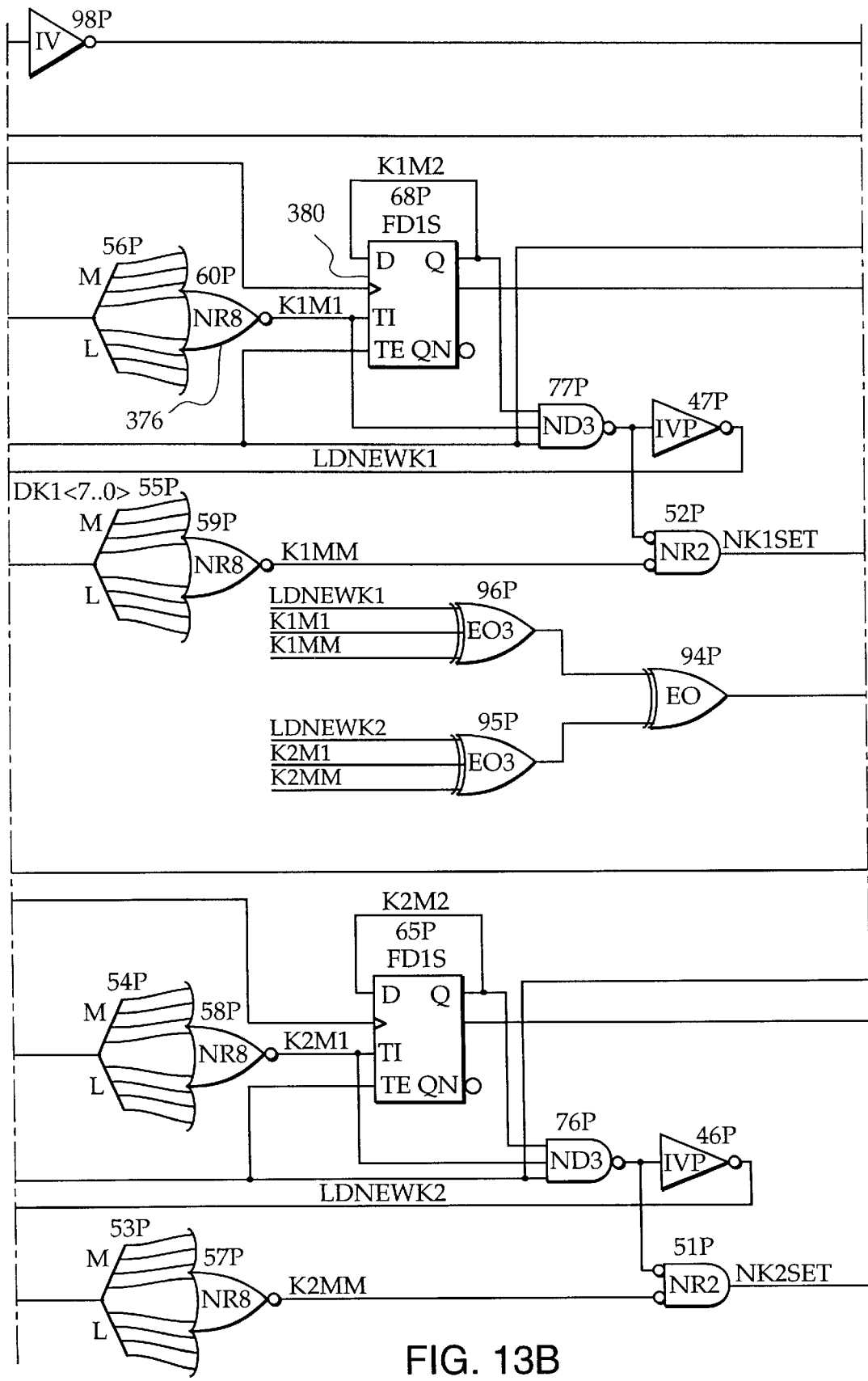
Figure 13C:
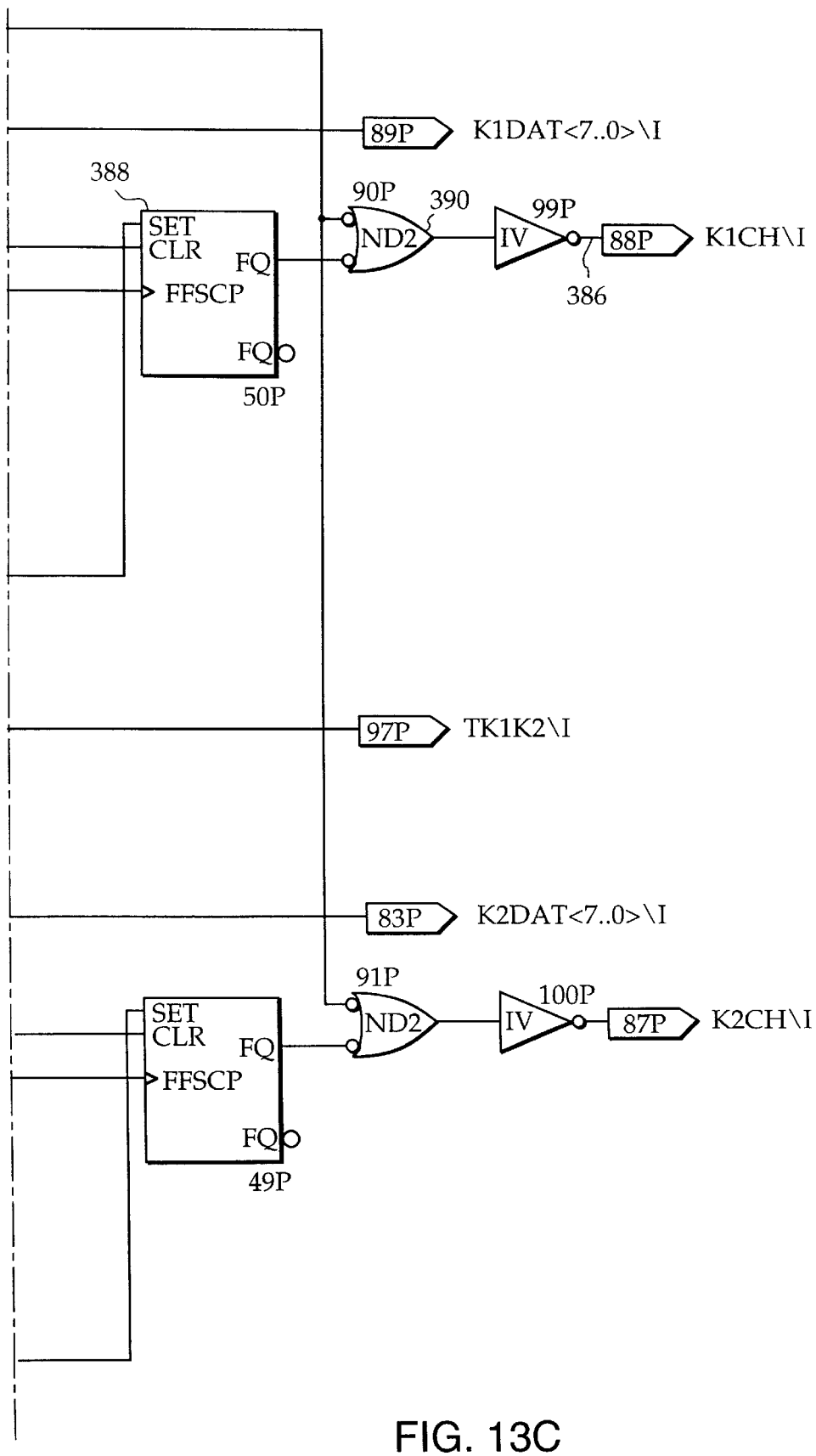

The interfacing device 224 of FIG. 8 is shown in more detail in FIGS. 9A, 9B and 9C which fit together as shown in FIG. 9. The transmit STS-1* receive block of FIG. 9 is shown in more detail in FIG. 10. The B2 error detection block of FIG. 10 is shown in more detail in FIG. 11. The up/down counter of FIG. 10 is shown in more detail in FIGS. 12A and 12B which fit together as shown in FIG. 12 and the K1 K2 filter of FIG. 10 is shown in more detail in FIGS. 13A, 13B and 13C which fit together as shown in FIG. 13. These diagrams are self-explanatory and need not be described here.

Figure 11:
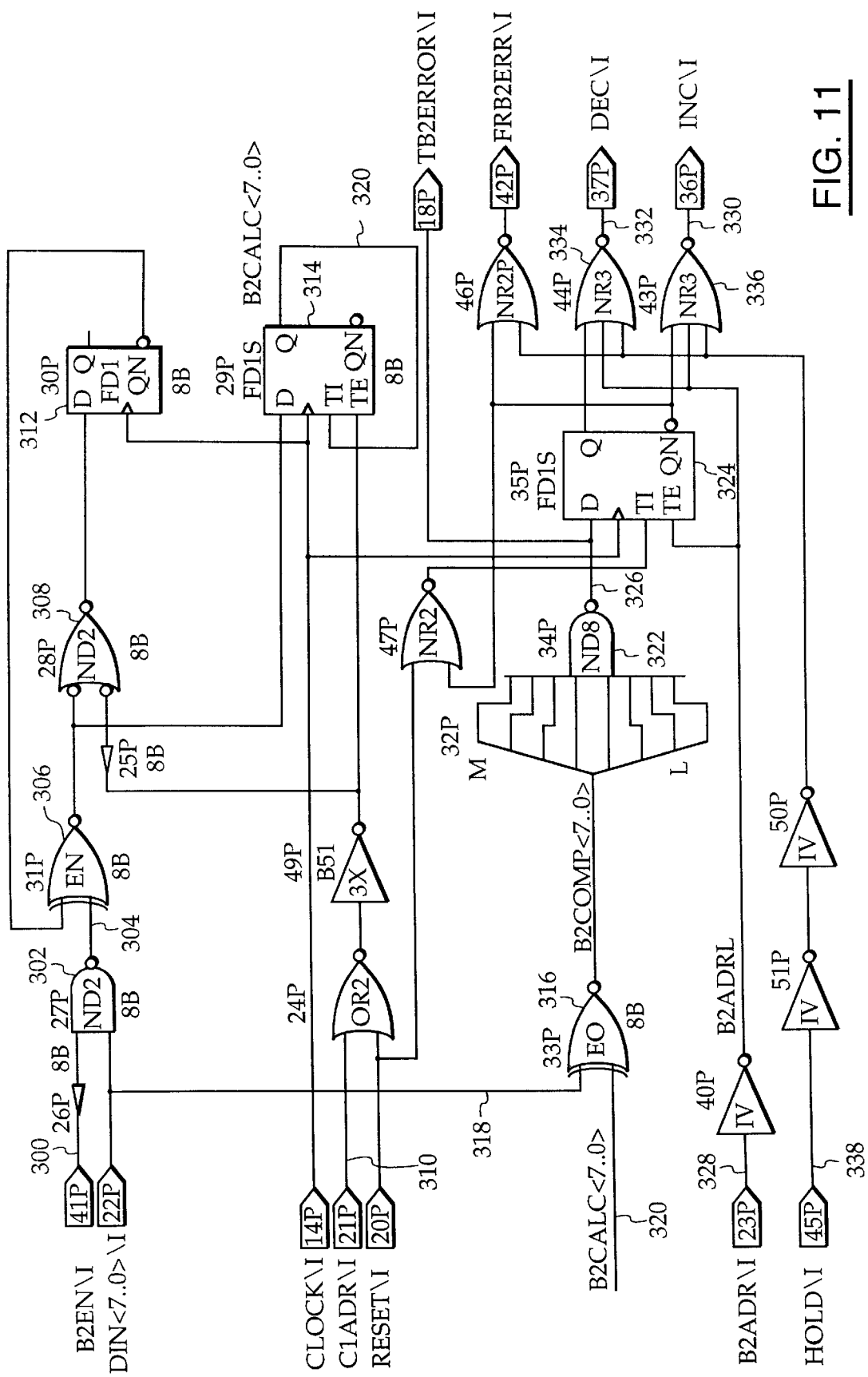
FIG. 11 shows the B2 error detection block of FIG. 10 in greater detail.

Referring to the B2 error detection process shown in FIG. 11, the odd parity BIP-8 calculation is performed on 801 bytes of SONET frame when a B2EN signal on a line 300 is active high.

An ND2 (27p) gate 302 provides data on a line 304 when the parity calculation is enabled into an adder EN (31p) 306, ND2 (28p) 308 controlled by a start of the frame signal C1ADR on a line 310 (C1ADR is the third byte of the frame, but B2* is not calculated on the previous two bytes) and provides the seed into the calculator (so it starts adding to the top of 11111111). A flip-flop FD1 (30p) 312 holds the results, which will change every clock period.

A flip-flop FD1S (29p) 314 is enabled by the C1ADR signals at the start of the frame and holds the results calculated over the previous frame until the start of the next frame.

A comparator EO (33p) 316 compares the incoming B2* value on a line 318 with the calculated B2* (B2CALC <7..0>) value on a line 320 separately for every bit. A gate ND8 (34p) 322 detects one or more differences between the comparator bits as a single error. A flip-flop FD1S (35p) 324 is used to hold error conditions on a line 326. A B2ADR signal on a line 328 is used to generate an INC pulse on a line 330 if there is an error, and DEC pulse on a line 332 if there is no error. A gate NR3 (44p) 334 outputs the decrement signal and is active for one clock period if there is no error; a gate NR3 (43p) 336 outputs the increment signal and is active for one clock period if there is an error. A hold input signal on a line 338 stops the functionality of the circuit related to the loop condition of the ASIC (if ASIC outputs are looped into the inputs internally).

The UPDOWN 32 counter of FIGS. 12A and 12B is a 5-bit counter 348 which increments with an up signal on a line 350 and decrements with a down signal on a line 352. Increments take place as a count of four at a time, and decrements are one count at a time.

If the counter outputs are 00000, this is detected by gates ND5 (36p) 356 and IV (53p) 358 and prevents counting below 0. (The counter does not decrement if its outputs are 0.) If the counter outputs are 11111, 11110, 11101, 11100, this is detected with a gate NR3 (60p) 360, and it is not allowed to increment any more, because the minimum increment is four counts, and it will exceed 11111.

The K1K2 filter of FIGS. 13A, 13B and 13C shows that the received K1 value is captured when K1 byte address K1 is active high from the data inputs DIN<7..0>on a line 370 by the flip-flop FD1S (70p) 372.

The outputs of flip-flop FD1S (70p) 372 and the received data DIN<7..0>on a line 370 are compared using exclusive-or gate EO (64p) 374, and a mismatch is detected by a gate NR8 (60p) 376. Since the DIN <7..0>signal on the line 370 is changing every clock period, the correct result of the comparison will be valid only during the period when K1 input is active high and it is stored in a flip-flop FD1S (68p) 378, if the output of a flip-flop FD1S (68p) 380 and the new result of the comparison at the NR8 (60p) 376 output agrees, the flip-flop FD1S (69p) 378 is loaded with the previous frame data from the outputs of FDLS (70p) 372. The outputs of flip-flop FD1S (69p) 378 and flip-flop FD1S (68p) 380 are compared using an exclusive-or gate EO (63p) 382, and a mismatch occurs if any of the bits is caught by a gate NR8 (58p) 384. If all of the bits are the same, an interrupt signal K1CH on a line 386 is generated for software at the output of a flip-flop (50p) FFSCP 388. A gate ND2 (90p) 390 is used to disable the interrupts if the ASIC is in loop mode.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method for transferring data in a synchronous optical network (SONET) element between a line interface and a cross-connect, comprising the steps of:

calculating, in response to a SONET signal having a plurality of signals in a repetitive frame structure, odd parity of a selected odd number of signals in each frame for providing a transmit parity signal in an internal signal;

calculating and verifying, in response to said internal signal, odd parity of said selected odd number of signals in each frame for providing for each frame a received parity signal indicative of correct or incorrect parity;

counting, in response to said received parity signal, said received parity signals indicative of incorrect parity, for providing an error signal in the presence of a number of received parity signals exceeding or equalling a selected number.

2. A signal processing method for use in each of a plurality of synchronous optical network (SONET) elements, each element (100) for processing a pointer signal of a virtual tributary (VT) signal having a VT signal structure for transporting and switching of sub-synchronous transport signal level 1 (sub-STS-1) payload SONET format signals in the SONET, comprising the steps of responding to a SONET format (185) signal (102) having a synchronous payload envelope (SPE) having the VT signal structure having an SPE pointer signal (H1, H2) value (B) and having a VT pointer signal value (D), by providing an internal signal (104a) in a signal format internal to the SONET element (188) having a selected fixed SPE pointer signal (H1*, H2*) value and an adjusted VT pointer signal value (Y), for cross connection by a cross-connect (114) within the SONET element wherein the fixed pointer signal (H1*, H2*) value is used to cause all virtual tributaries in the internal signal (104a) to be frame aligned prior to cross-connection and wherein the adjusted VT pointer signal value is used to keep data in the virtual tributaries in the internal signal (104a) in a same relative position in time with respect to the same data in the SONET format (185) signal (102).

3. A method for transferring data and overhead in a synchronous optical network (SONET) element (100) between line interfaces (101, 150) and a cross-connect (114), comprising the steps of:

providing, in response to a SONET synchronous transport signal (STS) format signal (102, 164) in STS mode, an internal signal (104a, 168a) having a frame format having eight hundred and ten bytes organized in nine rows and ninety columns, wherein a first through third columns are reserved for overhead bytes and a fourth through ninetieth columns are reserved for data bytes, and wherein a framing pattern byte (A1*) in a first row and first column of the frame has binary content 11110110, a second framing pattern byte (A2*) in the first row and second column has a binary content 00101000, a signal label byte (C1*) in the first row and third column has a binary content 00000001, a section error monitoring byte (B1*) in a second row and first column of the frame, which has no function specified for said method for transferring data and overhead between line interfaces and the cross-connect, a pair of unassigned bytes are in the second row and second and third columns of the frame which has no function specified for said method for transferring data and overhead between line interfaces and the cross-connect, three unassigned bytes are in the third row and first three columns of the frame which have no function specified for said method for transferring data and overhead between line interfaces and the cross-connect, a first synchronous transport signal pointer byte (H1*) in the fourth row and first column of the frame which has no function specified for said method for transferring data and overhead between line interfaces and the cross-connect, a second synchronous transport signal pointer byte (H2*) in the fourth row and second column of the frame which has no function specified for said method for transferring data and overhead between line interfaces and the cross-connect, a pointer action byte (H3*) in the fourth row and third column of the frame for frequency justification and, in the event of a negative justification, it carries an extra synchronous payload envelope byte, an internal interface link error monitoring byte (B2*) is in a fifth row and first column of the frame for monitoring internal data path connections between modules with odd parity, an internal link automatic protection switching byte is in the fifth row and second column of the frame and having selection request commands for requesting an automatic protection switching event between interfaces from redundant equipment, a second internal link automatic protection switching byte (K2*) is in the fifth row and third column of the frame having a status indication from an internal selecting module back to a selected module, twelve undefined bytes are in the first three columns of the frame and the sixth through ninth rows which have no function specified for said method for transferring data and overhead between line interfaces and the cross-connect; and providing, in response to a SONET VT format signal (102, 164), an internal signal (104*a*, 168*a*) having a frame format having a frame structure comprising eight hundred and ten bytes organized in nine rows of ninety columns having a first three columns reserved for transport overhead, and fourth column for path overhead, and a thirty-fourth and sixty-third column for fixed stuff bytes, with remaining columns for data, wherein for transport overhead, the byte definitions are the same as for STS mode definitions, except for the following pointer bytes:

first and second synchronous signal pointer bytes (H1*, H2*) together having a fixed value assigned thereto, a pointer action byte (H3*) in the third column and fourth row having a fixed value 00000000.

\* \* \* \* \*

UNITED STATES PATENT AND TRADEMARK OFFICE
CERTIFICATE OF CORRECTION

PATENT NO. : 5,872,780  
DATED : February 16, 1999  
INVENTOR(S) : Demiray et al Page 1 of 4

It is certified that error appears in the above-identified patent and that said Letters Patent is hereby corrected as shown below:

At col. 14, line 11 (claim 1, line 14), cancel "said" and insert --each--, and, after "signal", insert --from among plural received parity signals--;

at line 12, insert --plural-- prior to "received";

at line 14 (claim 1, line 17), after "signals", insert --indicative of incorrect parity--;

at line 18 (claim 2, line 3), prior to "element (100)", insert --SONET--;

at line 22 (claim 2, line 7), after "SONET", insert --elements--;

at line 31 (claim 2, line 16), insert --selected-- prior to "fixed", and insert --SPE-- after "fixed";

at line 32 (claim 2, line 17), cancel "all";

at line 36 (claim 2, line 21), cancel "the same";

at line 44 (claim 3, line 7), after "frame", insert --with a frame--;

at line 49 (claim 3, line 12), after "wherein", insert --byte definitions are as follows:--;

at line 52 (claim 3, line 15), prior to "first", cancel "the" and substitute --a--;

UNITED STATES PATENT AND TRADEMARK OFFICE
CERTIFICATE OF CORRECTION

PATENT NO. : 5,872,780
DATED : February 16, 1999
INVENTOR(S) : Demiray et al

It is certified that error appears in the above-identified patent and that said Letters Patent is hereby corrected as shown below:

at line 59 (claim 3, line 22), after "overhead", insert --in the SONET element--;

at line 60 (claim 3, line 23), prior to "second", cancel "the" and substitute --a--;

at line 63 (claim 3, line 26), after "overhead", insert --in the SONET element--; and at line 65 (claim 3, line 28), prior to "third", cancel "the" and substitute --a--.

At col. 15, line 1 (claim 3, line 30) after "overhead", insert --in the SONET element--;

at line 4 (claim 3, line 33), prior to "fourth", cancel "the" and substitute --a--;

at line 6 (claim 3, line 35), after "overhead", insert --in the SONET element--;

at line 9 (claim 3, line 38), prior to "fourth", cancel "the" and substitute --a--;

at line 11 (claim 3, line 40), after "overhead", insert --in the SONET element--;

at line 15 (claim 3, line 44), prior to "event", cancel "the" and substitute --an--; and cancel "it" and substitute --said pointer action byte-- therefor; and

UNITED STATES PATENT AND TRADEMARK OFFICE
CERTIFICATE OF CORRECTION

PATENT NO. : 5,872,780  
DATED : February 16, 1999  
INVENTOR(S) : Demiray et al Page 3 of 4

It is certified that error appears in the above-identified patent and that said Letters Patent is hereby corrected as shown below:

at line 22 (claim 3, line 51), prior to "fifth", cancel "the" and substitute --a-- therefor.

At col. 16, line 5 (claim 3, line 59), cancel "three" and substitute --through third-- therefor;

at line 6 (claim 3, line 60), cancel "the sixth through ninth rows" and substitute -- in a sixth row through a nineth row-- therefor;

at line 8 (claim 3, line 62), prior to "overhead" insert --in a SONET element--;

at lines 19-20 (claim 3, lines 73-74), cancel "the following"; and

UNITED STATES PATENT AND TRADEMARK OFFICE
CERTIFICATE OF CORRECTION

PATENT NO.   : 5,872,780
DATED        : February 16, 1999
INVENTOR(S)  : Demiray, et al It is certified that error appears in the above-identified patent and that said Letters Patent is hereby corrected as shown below:

At Col. 16, line 20 (claim 3, line 74), after "bytes", insert --which follow--.

Signed and Sealed this

First Day of February, 2000

Attest:

Attesting Officer

Q. TODD DICKINSON

Acting Commissioner of Patents and Trademarks